US011308378B2

(12) United States Patent
McCoy et al.

(10) Patent No.: US 11,308,378 B2
(45) Date of Patent: Apr. 19, 2022

(54) OPTICAL ARTICLES AND SYSTEMS INTERACTING WITH THE SAME

(71) Applicant: 3M INNOVATIVE PROPERTIES COMPANY, St. Paul, MN (US)

(72) Inventors: Michael A. McCoy, St. Paul, MN (US); Anne C. Gold, St. Paul, MN (US); Silvia Geciova-Borovova Guttmann, St. Paul, MN (US); Glenn E. Casner, Woodbury, MN (US); Timothy J. Gardner, St. Paul, MN (US); Steven H. Kong, Woodbury, MN (US); Gautam Singh, Woodbury, MN (US); Jonathan T. Kahl, Woodbury, MN (US); Nathan J. Anderson, Woodbury, MN (US); Catherine L. Aune, Hammond, WI (US); Caroline M. Ylitalo, Stillwater, MN (US); Britton G. Billingsley, St. Paul, MN (US); Muhammad J. Afridi, Woodbury, MN (US); Kui Chen-Ho, Woodbury, MN (US); Travis L. Potts, Woodbury, MN (US); Robert W. Shannon, Stillwater, MN (US); Guruprasad Somasundaram, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/486,382

(22) PCT Filed: Sep. 27, 2017

(86) PCT No.: PCT/US2017/053645
§ 371 (c)(1),
(2) Date: Aug. 15, 2019

(87) PCT Pub. No.: WO2018/151760
PCT Pub. Date: Aug. 23, 2018

(65) Prior Publication Data
US 2020/0012911 A1 Jan. 9, 2020

Related U.S. Application Data

(60) Provisional application No. 62/536,654, filed on Jul. 25, 2017, provisional application No. 62/461,041, filed on Feb. 20, 2017.

(51) Int. Cl.
*G06K 19/06* (2006.01)
*G02B 5/12* (2006.01)
(Continued)

(52) U.S. Cl.
CPC ......... *G06K 19/06037* (2013.01); *G02B 5/12* (2013.01); *G02B 5/124* (2013.01);
(Continued)

(58) Field of Classification Search
CPC ..... G06K 19/06037; G06K 2019/0629; G02B 5/124; G02B 5/12
See application file for complete search history.

(56) References Cited

U.S. PATENT DOCUMENTS

| 2,407,680 A | 9/1946 | Palmquist |
| 3,700,305 A | 10/1972 | Bingham |

(Continued)

FOREIGN PATENT DOCUMENTS

| AU | 80187-87 | 5/1988 |
| CA | 2000405 | 4/1990 |

(Continued)

OTHER PUBLICATIONS

"ANSI Class 2 Hi Visibility Safety Vests", Hi Vis Supply, [retrieved on Oct. 13, 2019], URL <https://www.hivissupply.com/ansi-class-2-safety-vests.html>, pp. 1-5.
(Continued)

*Primary Examiner* — Christle I Marshall
(74) *Attorney, Agent, or Firm* — Steven A. Bern; Dena M. Ehrich

(57) ABSTRACT

Optical articles including a spatially defined arrangement of a plurality of data rich retroreflective elements, wherein the
(Continued)

plurality of retroreflective elements comprise retroreflective elements having at least two different retroreflective properties and at least two different optical contrasts with respect to a background substrate when observed within an ultraviolet spectrum, a visible spectrum, a near-infrared spectrum, or a combination thereof.

17 Claims, 29 Drawing Sheets

(51) Int. Cl.
*G02B 5/124* (2006.01)
*G02B 5/30* (2006.01)
(52) U.S. Cl.
CPC ............ *G02B 5/305* (2013.01); *G02B 5/3025* (2013.01); *G06K 2019/0629* (2013.01)

(56) References Cited

U.S. PATENT DOCUMENTS

| | | | |
|---|---|---|---|
| 3,887,268 A | 6/1975 | Golden | |
| 3,894,790 A | 7/1975 | Golden | |
| 4,244,683 A | 1/1981 | Rowland | |
| 4,618,518 A | 10/1986 | Pricone | |
| 4,672,089 A | 6/1987 | Pricone | |
| 4,835,720 A | 5/1989 | Ditto | |
| 4,950,525 A | 8/1990 | Bailey | |
| 5,023,597 A | 6/1991 | Salisbury | |
| 5,153,928 A | 10/1992 | Lizuka | |
| 5,495,097 A | 2/1996 | Katz | |
| 5,565,669 A | 10/1996 | Liu | |
| 5,656,360 A | 8/1997 | Faykish | |
| 5,840,405 A | 11/1998 | Shusta | |
| 5,889,615 A | 3/1999 | Dreyer | |
| 5,902,988 A | 5/1999 | Durbin | |
| 5,919,551 A | 7/1999 | Cobb, Jr. | |
| D413,731 S | 9/1999 | Hannington | |
| 5,948,488 A | 9/1999 | Marecki | |
| 5,988,505 A | 11/1999 | Shellhammer | |
| 6,045,230 A | 4/2000 | Dreyer | |
| 6,097,839 A | 8/2000 | Liu | |
| 6,153,128 A | 11/2000 | Lightle | |
| 6,253,477 B1 | 7/2001 | Balint | |
| 6,360,949 B1 | 3/2002 | Shepard | |
| 6,595,420 B1 | 7/2003 | Wilz, Sr. | |
| D480,879 S | 10/2003 | Boehm | |
| 6,832,728 B2 | 12/2004 | Kennedy | |
| 7,110,618 B2 | 9/2006 | Bobrov | |
| 7,140,741 B2 | 11/2006 | Fleming | |
| 7,263,217 B2 | 8/2007 | Kawaike | |
| 7,387,393 B2 | 6/2008 | Reich | |
| 7,505,620 B2 | 3/2009 | Braune | |
| 7,661,596 B1 | 2/2010 | Spitz | |
| 7,783,443 B2 | 8/2010 | Aratani | |
| 8,126,640 B2 | 2/2012 | Winner | |
| 8,195,394 B1 | 6/2012 | Zhu | |
| 8,279,277 B2 | 10/2012 | Nam | |
| 8,320,634 B2 | 11/2012 | Deutsch | |
| 8,584,950 B2 | 11/2013 | Endo | |
| 8,622,555 B2* | 1/2014 | Krishnan | B42D 25/29 359/536 |
| 8,668,341 B2* | 3/2014 | Caswell | G02B 5/124 359/530 |
| 8,780,034 B2 | 7/2014 | Kimura | |
| 8,851,688 B2 | 10/2014 | Huang | |
| 8,950,877 B2* | 2/2015 | Northey | G02B 5/124 359/530 |
| 9,070,057 B2 | 6/2015 | Hamilton | |
| 9,143,843 B2 | 9/2015 | De Luca | |
| 9,155,346 B2 | 10/2015 | Wu | |
| 9,248,470 B2 | 2/2016 | Koppes | |
| 9,347,744 B2* | 5/2016 | Lampe | A42B 1/004 |
| 9,349,043 B2 | 5/2016 | Ryu | |
| 9,401,024 B2 | 7/2016 | Kwiatkowski | |
| 9,430,708 B2 | 8/2016 | Han | |
| 9,519,087 B2 | 12/2016 | Nakajima | |
| 9,661,882 B2 | 5/2017 | White | |
| 9,978,320 B2 | 5/2018 | Kimura | |
| 10,420,379 B2 | 9/2019 | Pond | |
| 2002/0039184 A1 | 4/2002 | Sandusky | |
| 2002/0134839 A1 | 9/2002 | Iwaki | |
| 2003/0001019 A1 | 1/2003 | Corby, Jr. | |
| 2003/0138133 A1 | 7/2003 | Nagaoka | |
| 2003/0150043 A1 | 8/2003 | Koppes | |
| 2004/0257627 A1 | 12/2004 | Mclurg | |
| 2005/0023352 A1 | 2/2005 | Patel | |
| 2005/0063565 A1 | 3/2005 | Nagaoka | |
| 2005/0111698 A1 | 5/2005 | Kawai | |
| 2005/0119779 A1 | 6/2005 | Amico | |
| 2006/0027661 A1 | 2/2006 | Hosoi | |
| 2006/0140485 A1 | 6/2006 | Hing | |
| 2007/0023523 A1 | 2/2007 | Onishi | |
| 2007/0222565 A1 | 9/2007 | Kawamata | |
| 2008/0000976 A1 | 1/2008 | Thomas | |
| 2008/0017717 A1 | 1/2008 | Miyazaki | |
| 2008/0085033 A1 | 4/2008 | Haven | |
| 2009/0134778 A1 | 5/2009 | Nishizeki | |
| 2009/0161918 A1 | 6/2009 | Heller | |
| 2009/0208065 A1 | 8/2009 | Miura | |
| 2009/0279738 A1 | 11/2009 | Sasaki | |
| 2010/0147949 A1 | 6/2010 | Sakuma | |
| 2010/0151213 A1 | 6/2010 | Smithson | |
| 2010/0245554 A1 | 9/2010 | Nam | |
| 2011/0007950 A1 | 1/2011 | Deutsch | |
| 2011/0193335 A1* | 8/2011 | Budd | C03C 12/02 283/75 |
| 2011/0228089 A1 | 9/2011 | Almeida | |
| 2012/0061469 A1 | 3/2012 | Sonoda | |
| 2012/0146789 A1 | 6/2012 | De Luca | |
| 2012/0314071 A1 | 12/2012 | Rosenbaum | |
| 2013/0075473 A1 | 3/2013 | Wang | |
| 2013/0135731 A1 | 5/2013 | Smith | |
| 2013/0147938 A1 | 6/2013 | McCloskey | |
| 2013/0265331 A1 | 10/2013 | Wu | |
| 2013/0282609 A1 | 10/2013 | Au | |
| 2013/0329988 A1 | 12/2013 | Levi | |
| 2014/0092475 A1* | 4/2014 | Krishnan | C03C 12/02 359/540 |
| 2014/0307076 A1 | 10/2014 | Deutsch | |
| 2014/0368661 A1 | 12/2014 | Angot | |
| 2015/0029012 A1 | 1/2015 | Mitani | |
| 2015/0131856 A1 | 5/2015 | Matsunaga | |
| 2015/0199018 A1 | 7/2015 | Kim | |
| 2015/0332463 A1 | 11/2015 | Galera | |
| 2016/0012301 A1 | 1/2016 | Arndt | |
| 2016/0021946 A1* | 1/2016 | White | A41D 13/01 359/518 |
| 2016/0162747 A1 | 6/2016 | Singh | |
| 2016/0252611 A1 | 9/2016 | Guecker | |
| 2016/0275326 A1 | 9/2016 | Falkenstern | |
| 2017/0010394 A1 | 1/2017 | Orensteen | |
| 2017/0083775 A1 | 3/2017 | Grauer | |
| 2017/0372607 A1 | 12/2017 | Janovec | |
| 2019/0018993 A1* | 1/2019 | Fernandez-Dorado | G06K 7/10811 |
| 2020/0042849 A1 | 2/2020 | Howard | |

FOREIGN PATENT DOCUMENTS

| | | |
|---|---|---|
| CA | 2020748 | 2/1991 |
| CA | 2880914 | 2/2014 |
| CA | 2938784 | 1/2019 |
| CN | 102693427 | 9/2012 |
| CN | 104424201 | 3/2015 |
| CN | 106056120 | 10/2016 |
| CN | 106022375 | 7/2019 |
| CN | 106056132 | 9/2019 |
| DE | 102004012811 | 2/2009 |
| DE | 102012106673 | 5/2014 |
| DE | 102013206915 | 10/2014 |
| EP | 0416742 | 3/1991 |

(56) References Cited

FOREIGN PATENT DOCUMENTS

| | | |
|---|---|---|
| EP | 0498499 | 8/1992 |
| EP | 0789314 | 8/1997 |
| EP | 0944018 | 9/1999 |
| EP | 1417634 | 5/2004 |
| EP | 1860594 | 11/2007 |
| EP | 1897751 | 3/2008 |
| EP | 2081131 | 7/2009 |
| EP | 2233818 | 9/2010 |
| EP | 2602740 | 6/2013 |
| EP | 2653772 | 10/2013 |
| EP | 2916147 | 9/2015 |
| EP | 2919150 | 9/2015 |
| EP | 2929150 | 10/2015 |
| EP | 3089003 | 11/2016 |
| FR | 2848167 | 6/2004 |
| GB | 2127344 | 4/1984 |
| GB | 2286152 | 8/1995 |
| GB | 2383222 | 6/2003 |
| GB | 2443664 | 5/2008 |
| IL | 75659 | 5/1990 |
| JP | 07223487 | 8/1995 |
| JP | 07223488 | 8/1995 |
| JP | 08122062 | 5/1996 |
| JP | H09134498 | 5/1997 |
| JP | 2580396 | 9/1998 |
| JP | H11272849 | 10/1999 |
| JP | 11328364 | 11/1999 |
| JP | 2003-288600 | 10/2003 |
| JP | 2003-302470 | 10/2003 |
| JP | 2004-145660 | 5/2004 |
| JP | 2005-309797 | 11/2005 |
| JP | 2006-134339 | 5/2006 |
| JP | 2007-072665 | 3/2007 |
| JP | 2007-093629 | 4/2007 |
| JP | 2007-156832 | 6/2007 |
| JP | 2007-308110 | 11/2007 |
| JP | 2008-070898 | 3/2008 |
| JP | 2008-238927 | 10/2008 |
| JP | 2010-015235 | 1/2010 |
| JP | 2012195018 | 10/2012 |
| SE | 201400134 | 10/2015 |
| WO | WO 1995-034043 | 12/1995 |
| WO | WO 1997-041466 | 11/1997 |
| WO | WO 1998-044202 | 10/1998 |
| WO | WO 1999-032940 | 7/1999 |
| WO | WO 1999-059271 | 11/1999 |
| WO | WO 2000-072275 | 11/2000 |
| WO | WO 2001-077721 | 10/2001 |
| WO | WO 2003-017184 | 2/2003 |
| WO | WO 2006-014974 | 2/2006 |
| WO | WO 2006-098954 | 9/2006 |
| WO | WO 2006-125224 | 11/2006 |
| WO | WO 2006-129249 | 12/2006 |
| WO | WO 2007-020666 | 2/2007 |
| WO | WO 2007-030530 | 3/2007 |
| WO | WO 2008-014090 | 1/2008 |
| WO | WO 2008-014831 | 2/2008 |
| WO | WO 2008-107987 | 9/2008 |
| WO | WO 2008-149923 | 12/2008 |
| WO | WO 2009-055738 | 4/2009 |
| WO | WO 2009-075987 | 6/2009 |
| WO | WO 2010-037158 | 4/2010 |
| WO | WO 2011-005222 | 1/2011 |
| WO | WO 2011-036414 | 3/2011 |
| WO | WO 2011-118540 | 9/2011 |
| WO | WO 2011-123741 | 10/2011 |
| WO | WO 2011-124483 | 10/2011 |
| WO | WO 2011-152843 | 12/2011 |
| WO | WO 2011-152844 | 12/2011 |
| WO | WO 2012-100082 | 7/2012 |
| WO | WO 2013-129352 | 9/2013 |
| WO | WO 2013-135608 | 9/2013 |
| WO | WO 2013-179588 | 12/2013 |
| WO | WO 2014-196171 | 12/2014 |
| WO | WO 2015-100284 | 7/2015 |
| WO | WO 2015-146414 | 10/2015 |
| WO | WO 2015-149009 | 10/2015 |
| WO | WO 2018-151759 | 8/2018 |
| WO | WO 2018-151760 | 8/2018 |

OTHER PUBLICATIONS

"Battenburg markings", Wikipedia, [retrieved on Oct. 13, 2019], URL, <https://en.wikipedia.org/wiki/Battenburg_markings>, pp. 1-5.
"Premium Ultra-Cool™ Mesh Class 2 Safety Vest", Traffic Safety Store, [retrieved on Oct. 13, 2019], URL <https://www.trafficsafetystore.com/safety-vests/premium-class-2-mesh#VEST PREM CL2 L-XL>, pp. 1-3.
"Reflective Safety Apparel", Economy Safety Vest: Hi Vis Vest: Zippered Mesh: ANSI 107-2015, Class 2, [retrieved on Oct. 13, 2019], URL <https://www.reflectiveapparel.com/RAF-581-ET-LM.aspx>, p. 1.
"Sillitoe Tartan", Wikipedia, [retrieved on Oct. 13, 2019], URL, <https://en.wikipedia.org/wiki/Sillitoe_Tartan>, pp. 1-9.
Felzenszwalb, "Object Detection with Discriminatively Trained Part Based Models", IEEE Transactions on Pattern Analysis and Machine Intelligence, 2010, vol. 32, No. 09, pp. 1627-1645.
Mosberger, "A Customized Vision System for Tracking Humans Wearing Reflective Safety Clothing from Industrial Vehicles and Machinery", Sensors, 2014, vol. 14, pp. 17952-17980.
Mosberger, "Multi-band Hough Forests for Detecting Humans with Reflective Safety Clothing from Mobile Machinery", Proceedings of the IEEE International Conference on Robotics and Automation, 2015, pp. 697-703.
Nakazato, "Localization of Wearable Users Using Invisible Retro-Reflective Markers And An IR Camera", 2005, pp. 1-8.
Nota, "Augmenting Real-world Objects by Defecting "Invisible" Visual Markers", Association for Computing Machinery, 2008, pp. 39-40.
International Search Report for PCT International Application No. PCT/US2017/053645, dated Dec. 8, 2017, 3 pages.

* cited by examiner

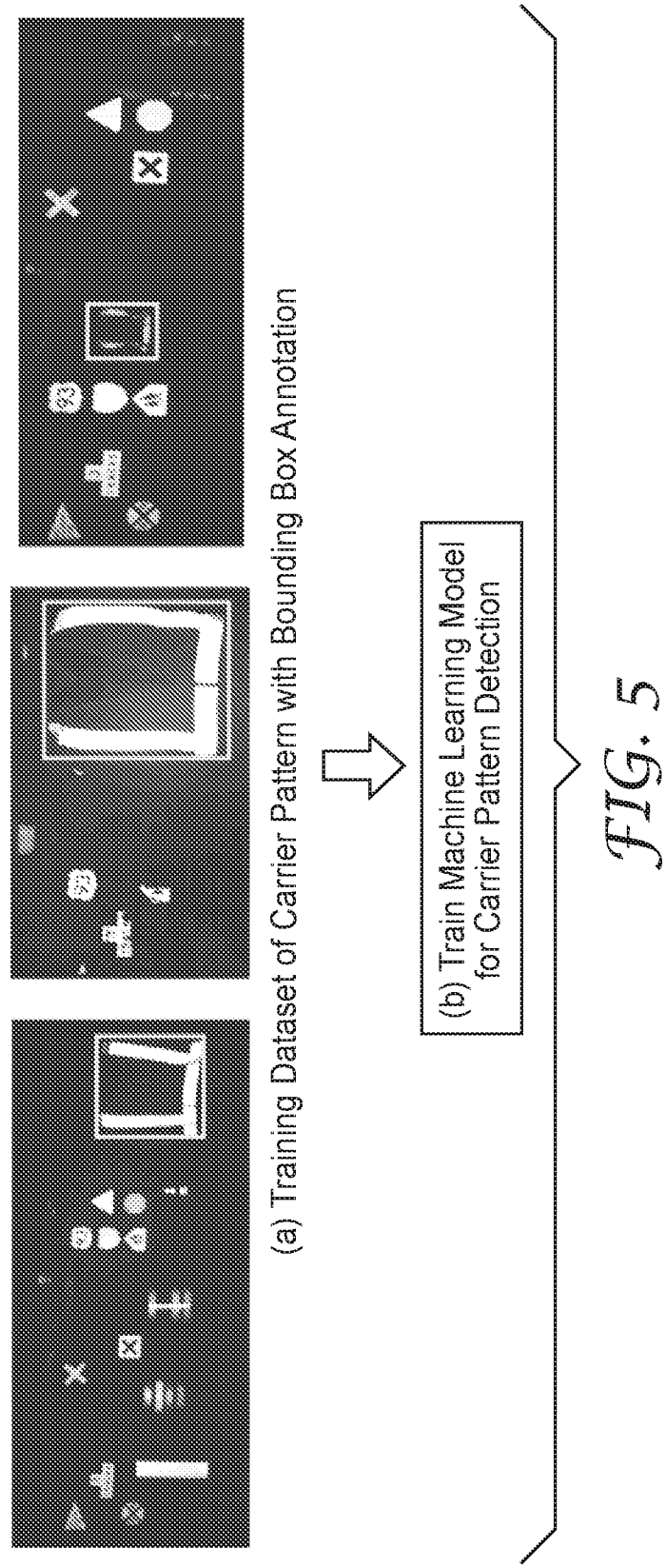

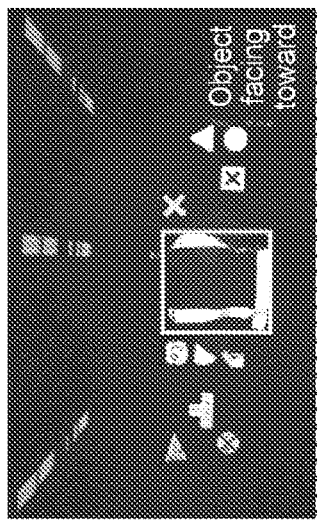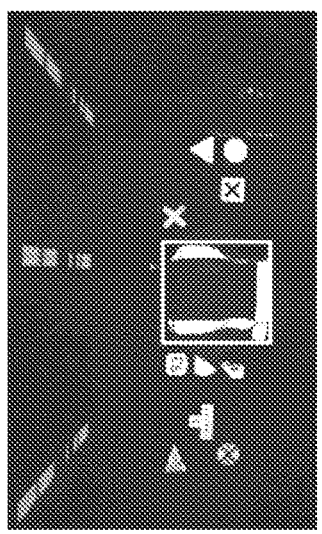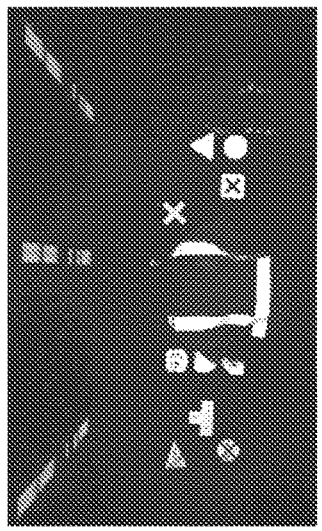
FIG. 8A
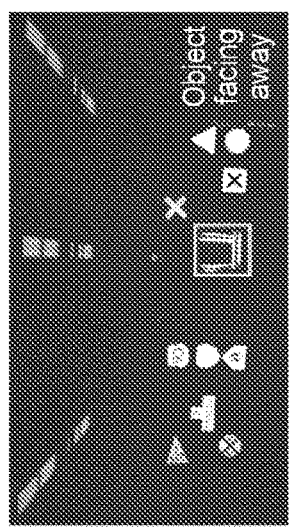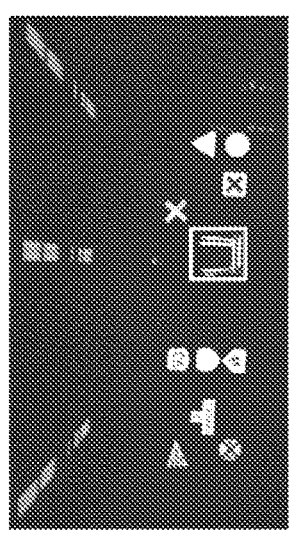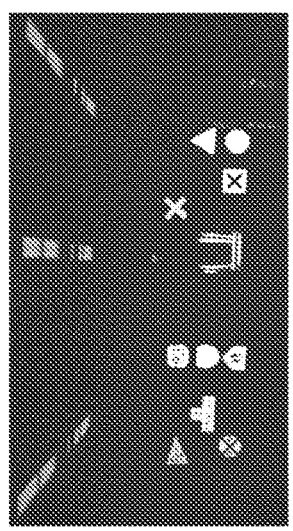
FIG. 8B

FIG. 23
FIG. 24

*FIG. 25*     *FIG. 26*
*FIG. 27*     *FIG. 28*
*FIG. 29*     *FIG. 30*

 
 
 
 
FIG. 31  FIG. 32
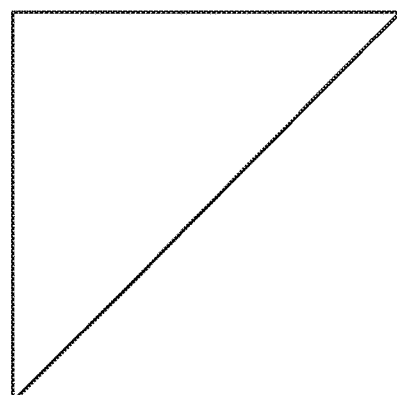
FIG. 33

OPTICAL ARTICLES AND SYSTEMS INTERACTING WITH THE SAME

CROSS REFERENCE TO RELATED APPLICATIONS

This application is a national stage filing under 35 U.S.C. 371 of PCT/IB2017/053645, filed Sep. 27, 2017, which claims the benefit of U.S. Provisional Application No. 62/461,041, filed Feb. 20, 2017, and Application No. 62/536,654, filed Jul. 25, 2017, the disclosure of which is incorporated by reference in its/their entirety herein.

TECHNICAL FIELD

The present disclosure relates to optical articles. More specifically, the present disclosure relates to optical articles that are configured to be readable and or noticed by both optical systems and human observers and systems including such optical articles.

BACKGROUND

Optical systems include methods for acquiring, analyzing, and understanding images. Illustrative applications of these systems include robotics, face recognition, image search, machine vision, remote sensing, surveillance, autonomous vehicles, and object detection to name a few. Some examples of applications of object detection include vehicle vision systems, autonomous vehicles, as well as worker safety.

In recent years, computer vision systems have taken numerous approaches to detecting objects of interest, like pedestrians. Most approaches to object detection include visible or near infrared cameras. The problem of object detection is complicated due to the complexity and variety of the environments in which the optical articles and systems can be located in (e.g., daytime or nighttime; sunny or cloudy; urban or city; construction, etc.), the variety of the poses that they can take, and the variety of their appearance based on size, clothing, etc., as well as due to potential partial occlusion.

Many of the pedestrian detection approaches employ exhaustive scanning over the entire image, or template based silhouette matching, body part matching. However, due to variety in the forms that humans can take in images, these approaches are very difficult, time consuming, and have less than ideal performance.

Similarly, the difficult task of detecting and identifying pedestrians at night by human observers led to introduction and regulation of high visibility garments. High visibility garments (i.e., garments with retro-reflective materials) are designed to make the wearer more visible or conspicuous by returning more of the incident light back to the light source and in patterns that can be readily recognized by human viewers as other human forms. Current optical systems are based on collecting a large amount of training data, having human experts annotate it and then training a model to detect the specific object of interest. This collection and annotation of data is time consuming and cost prohibitive.

Even in view of existing technology related to optical articles, there remains opportunity for improved optical articles and substrates, such as infrastructure, wearables, vehicles, and other articles, containing such optical articles.

SUMMARY

The present disclosure provides a number of advantages over existing optical articles and systems used therewith.

The present disclosure provides optical articles that can be readily observed and/or convey information under any conditions to a machine observer, a human observer, or both, to allow identification and tracking of such optical articles on users or objects.

The present disclosure provides an optical article comprising a data rich plurality of retroreflective elements that are configured in a spatially defined arrangement, wherein the plurality of retroreflective elements comprise retroreflective elements having at least two different retroreflective properties and at least two different optical contrasts, wherein data rich means information that is readily machine interpretable. In some instances, the data rich plurality of retroreflective elements are configured in a repeating spatially defined arrangement such that the information is interpretable even when the portion of the retroreflective elements are occluded.

In some instances, the at least two different retroreflective properties are at least two different retroreflective intensity values. In some instances, the at least two different retroreflective properties are at least two different wavelengths. In some instances, the at least two different retroreflective properties have at least two different polarization states. In some instances, the at least two different retroreflective properties have at least two different phase retardations.

In some instances, the spatially defined arrangement comprises geometric arrangement in which the retroreflective elements are positioned with a distance from their neighboring retroreflective elements, and wherein the retroreflective elements have a periodicity from one element to another within the spatially defined arrangement. In some instances, the periodicity is a regular periodicity. In some instances, the periodicity is an irregular periodicity. In some instances, the spatially defined arrangement is rotationally insensitive.

In some instances, a number of geometric arrangements are required per spatially defined arrangement depends on a required quality of fit. In some instances, the retroreflective elements are positioned from their nearest neighboring retroreflective elements by a characteristic distance. In some instances, the retroreflective elements have a characteristic ratio of size to distance to neighboring retroreflective elements that is invariant with viewing angle.

The present disclosure provides a fabric comprising the aforementioned articles.

The present disclosure also includes a system comprising any of the aforementioned articles, an optical system, and an inference engine for interpreting and classifying the plurality of retroreflective elements wherein the optical system feeds data to the inference engine. In some instances, the article is disposed on at least one of infrastructure, targets, wearables, and vehicles.

In some instances, the optical system is part of a vehicle, and further wherein the vehicle uses the information as an input to an autonomous driving module. In some instances, the vehicle uses the information to provide human language feedback to the driver. In some instances, the vehicle uses the information to provide at least one of haptic, audible or visual feedback to the driver.

In some instances, the data rich plurality of retroreflective elements is observable or visible in the infrared spectrum with a computer vision system, in the visible spectrum with the human eye, or visible with both. In some instances, the information related to the data rich plurality of retroreflective articles comprises at least one of road workers expected, pedestrians expected, construction workers expected, students expected, emergency responder workers expected.

In some instances, the inference engine is locally stored as a component of the optical system. In some instances, the optical system communicates with the inference engine using a wireless communication protocol. In some instances the inference engine includes a look up table with assigned meanings associated with specific patterns of data rich plurality of retroreflective elements. In some instances, the inference engine includes a look up table.

The above summary is not intended to describe each embodiment of the present disclosure. The details of one or more embodiments of the present disclosure are also set forth in the description below. Other features, objects, and advantages of the present disclosure will be apparent from the description and from the claims.

BRIEF DESCRIPTION OF DRAWINGS

The invention may be more completely understood in consideration of the following detailed description of various embodiments of the invention in connection with the accompanying drawings, in which:

FIG. 5 depicts an image of the object of interest (carrier pattern). The images are annotated with a bounding box located around the object as shown in (a). A machine learning model is trained to disambiguate between this carrier pattern and other objects found in the environment in (b).

FIGS. 8a and 8b depict an exemplary system for image processing useful in some embodiments in the presently disclosed system.

FIGS. 19 to 33 illustrate illustrative patterns of retroreflective elements demonstrated in Example 5.

Figure 1A:
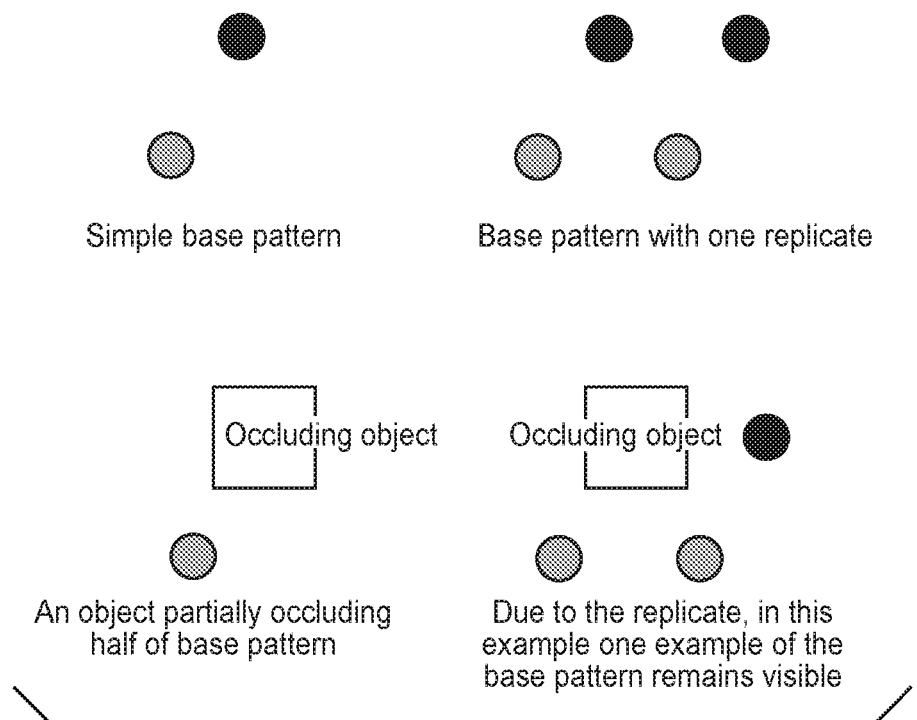
FIGS. 1a to 1m show various patterns of retroreflective elements included in the presently disclosed optical articles.
Figure 1B:
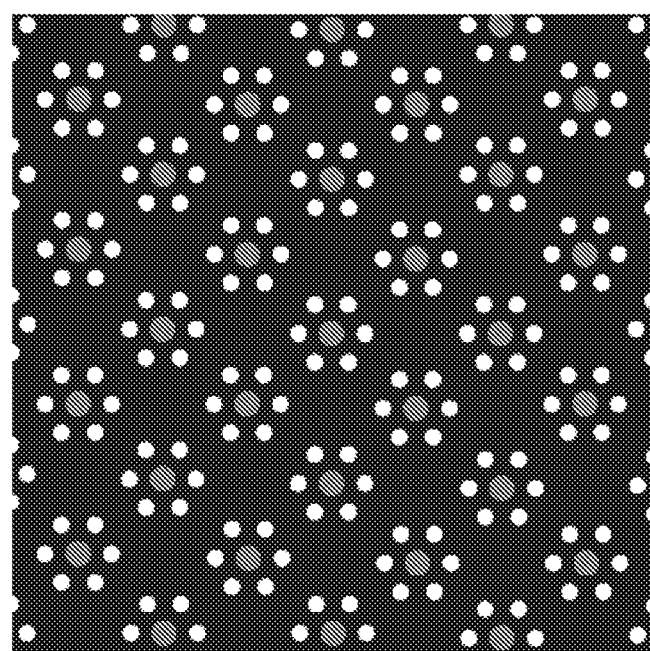
Figure 1C:
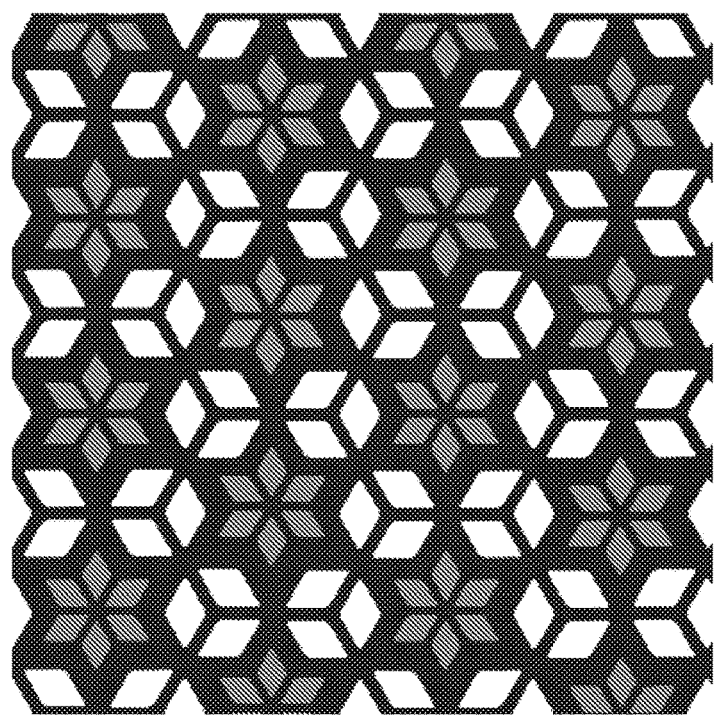
Figure 1D:
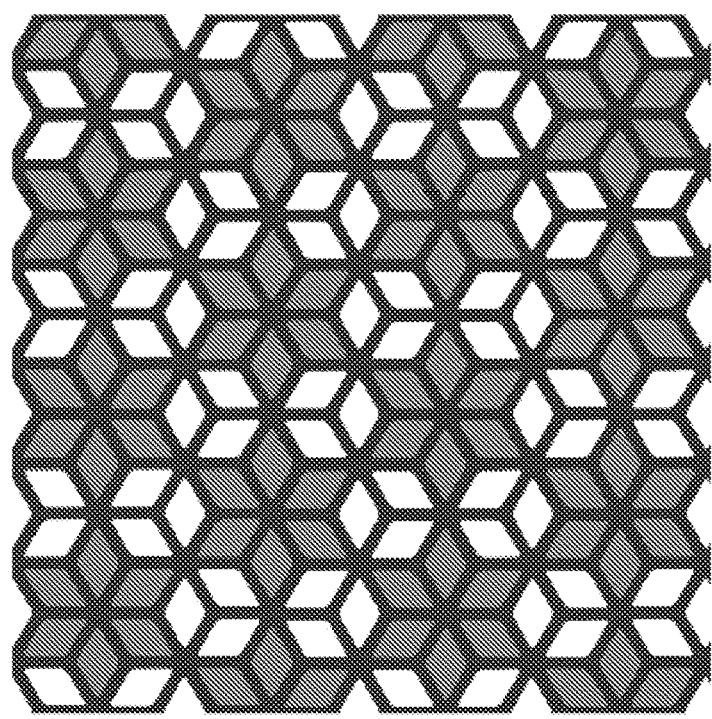
Figure 1E:
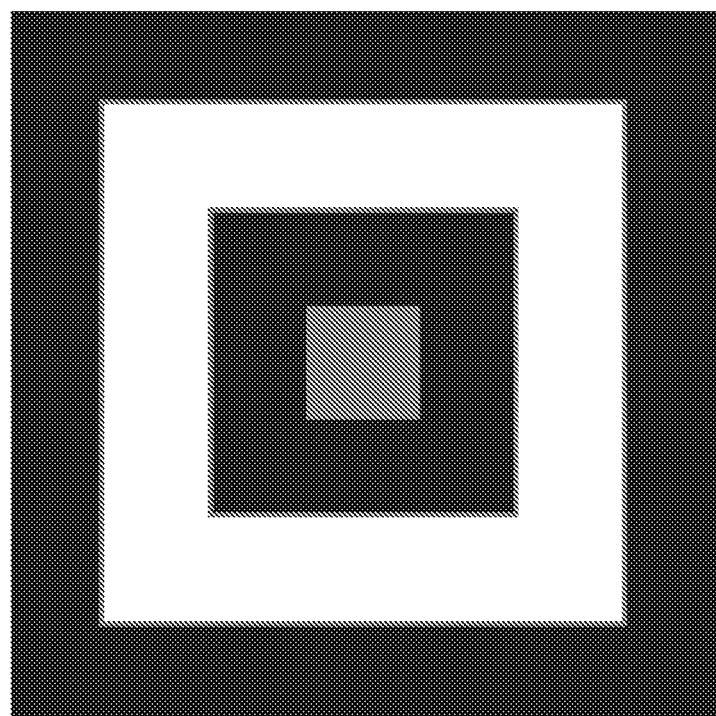
Figure 1F:
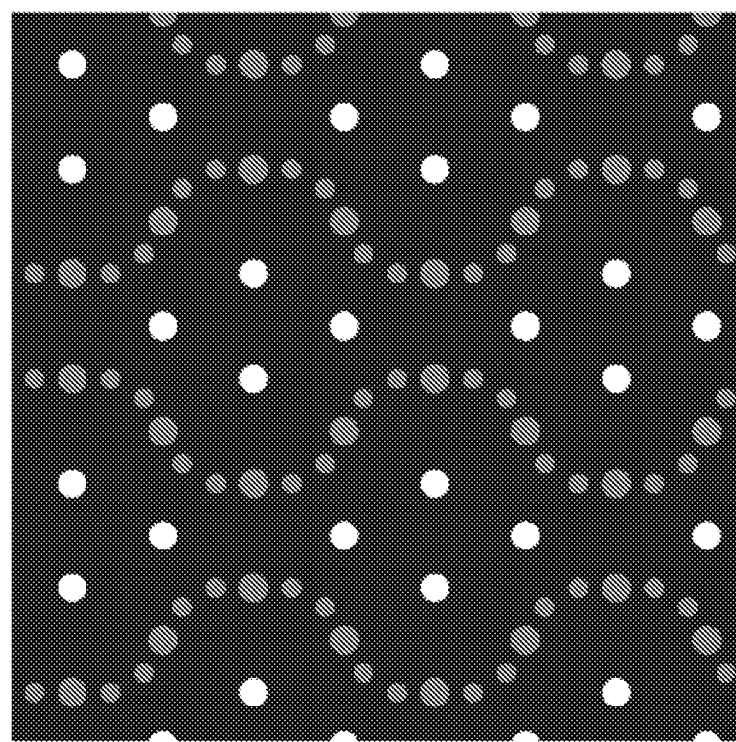
Figure 1G:
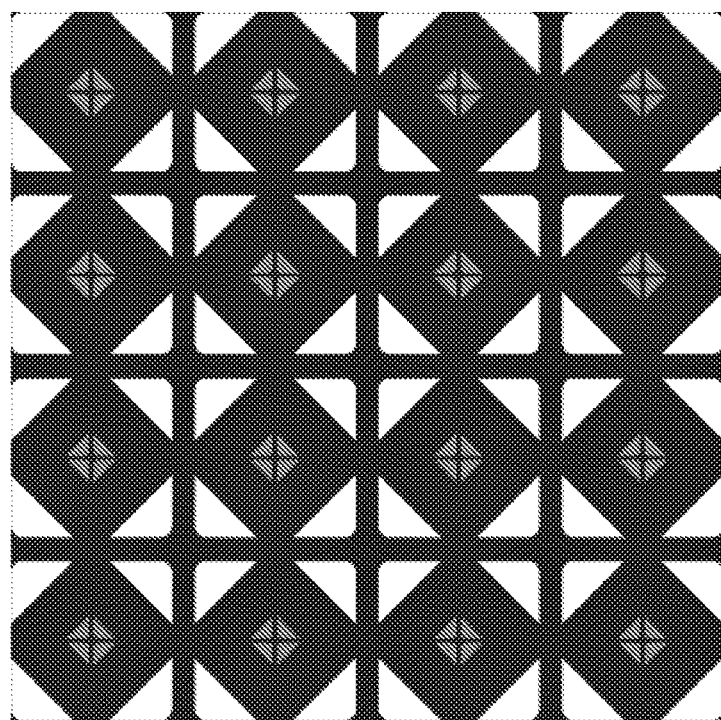
Figure 1H:
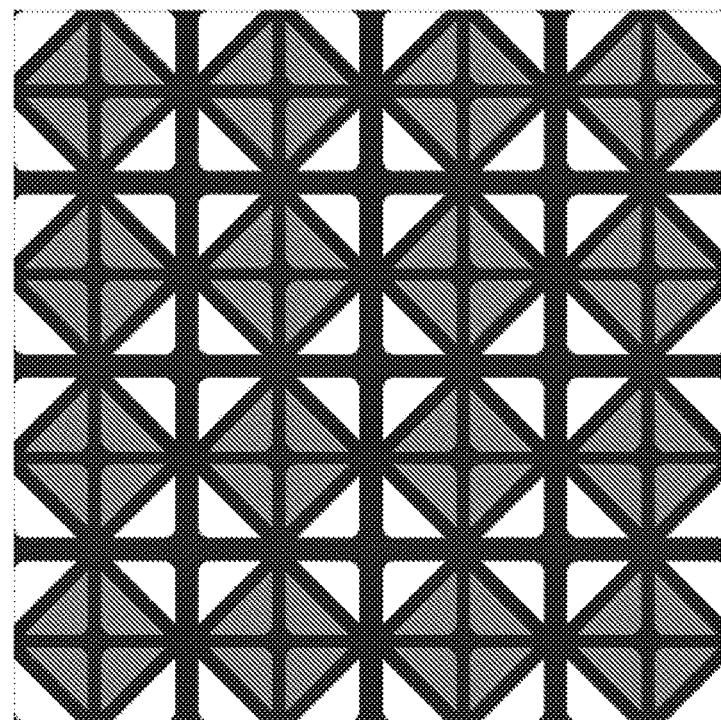
Figure 1I:
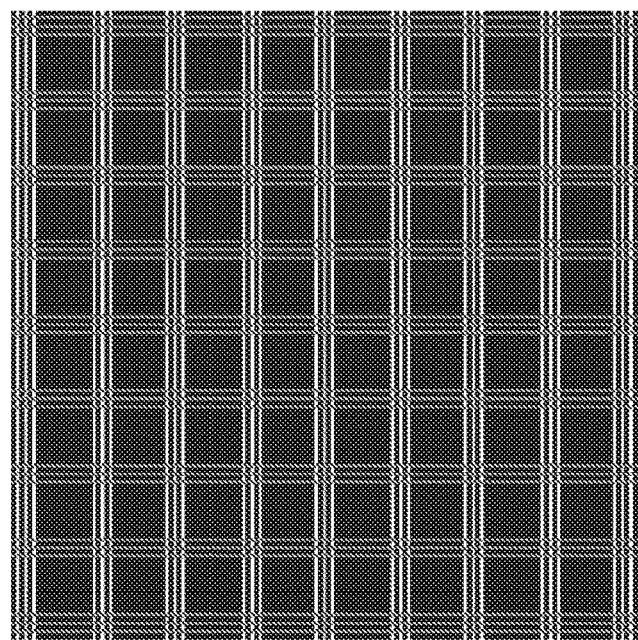
Figure 1J:
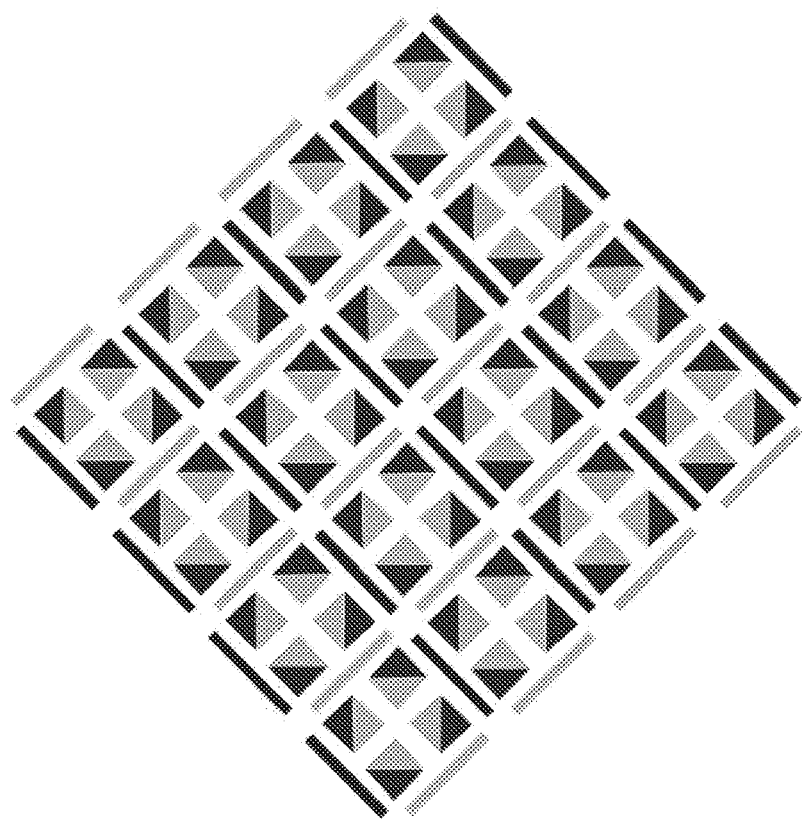
Figure 1K:
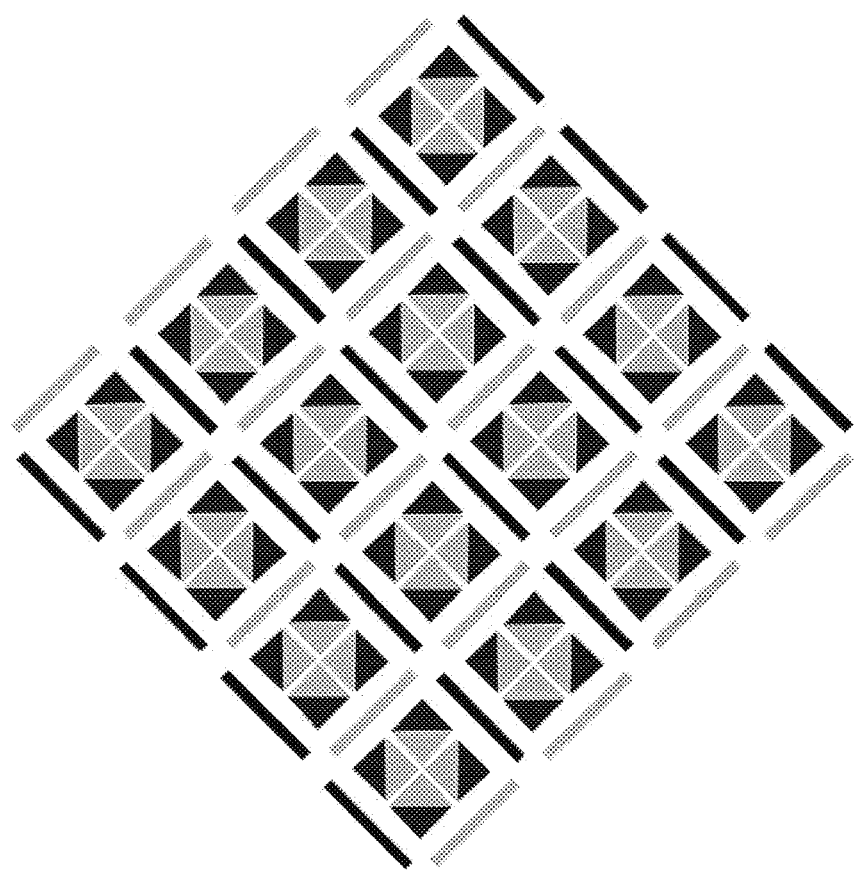
Figure 1L:
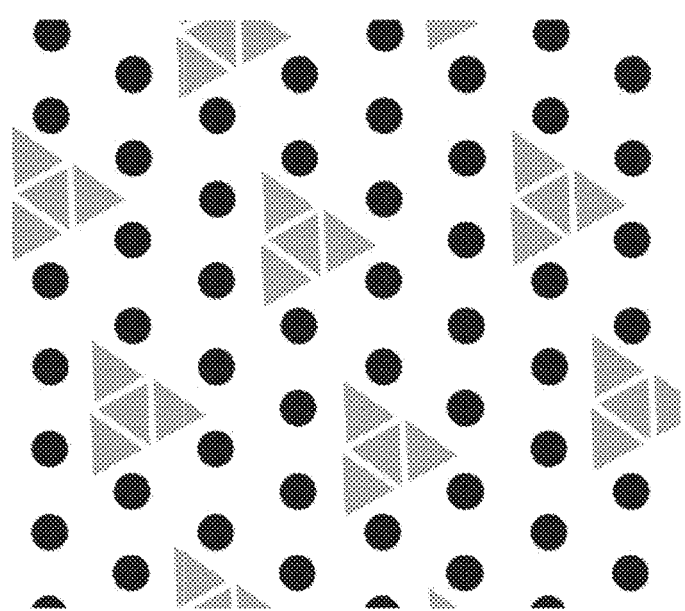
Figure 1M:
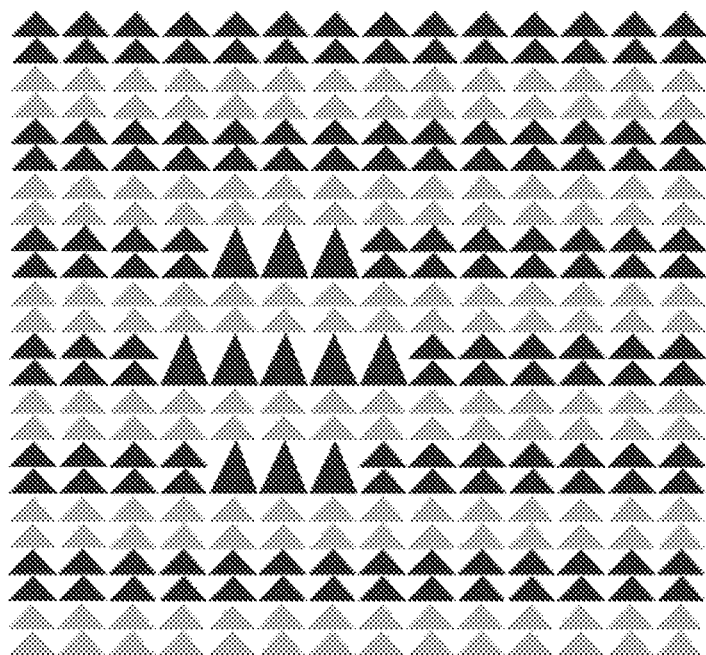

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Optical articles, such as retroreflective articles, redirect light incident on the article back toward its source. This property has led to many practical applications of retroreflective articles in the areas of traffic and personal safety. Retroreflective articles are currently used for traffic signs, car license plates, pavement markings, construction zone cones and barrels, and high visibility material on clothing worn by users (e.g., workers, pedestrians, animals, etc.).

Systems that interact with optical articles such as retroreflective articles include observers such as computer vision systems, optical systems and human observers. Disclosed retroreflective articles are visible by one or more of these observers in various types and levels of environmental conditions both initially and even after extended use.

The plurality of retroreflective elements includes retroreflective elements, where these plurality of retroreflective elements have at least two different retroreflective properties and at least two different optical contrasts with respect to a background substrate when observed within the ultraviolet spectrum, the visible spectrum, the near-infrared spectrum, or any combination thereof.

One of the biggest challenges to the performance of retroreflective articles is the vast and varied environmental factors that can affect the performance thereof. For example, retroreflective articles are desired to work in full light conditions (daytime full sun for example), full dark conditions (nighttime cloudy conditions for example), and everything in between. The specific factors that can play a role in how a particular retroreflective material or combination thereof may function can include, for example, brightness or lack thereof of the sun; angle and/or location of the sun with respect to the article; angle and/or location of the sun with respect to the observer; presence, absence or a combination thereof of clouds; presence, absence or a combination thereof of shadows; angle and/or location of shadows with respect to the article; angle and/or location of shadows with respect to the observer; angle and/or location of shadows with respect to the article; presence, absence or combination thereof of light sources other than the sun; angle and/or location of light sources other than the sun with respect to the article; angle and/or location of light sources other than the sun with respect to the observer; presence or absence as well as intensity of moisture level on article; and presence or absence of fog.

Different types of retroreflective articles can have different retroreflective responses to various environmental factors; different types of retroreflective articles can have different optical contrast responses with respect to the background thereof, to various environmental factors; and some retroreflective articles can have both a different retroreflective response and an optical contrast response with respect to the background thereof, to various environmental factors. In an illustrative scenario, two environmental factors that can have the most negative affect on observed optical contrast may include the angle of the sun with respect to the article, the observer, or both and the presence of dark shadows. For example, when the sun is behind the observer but falling directly on the object to be viewed, the direct sunlight on the garment containing the retroreflective article can saturate the sensor (either the eye of a human observer or a sensor of a non-human observer) such that there is no observable contrast between the retroreflective article and the background thereof for certain combinations of retroreflective articles and backgrounds. Similarly, when the sun is behind the object with the retroreflective article, the shadow cast on the observable side might be so dark that once again, there is no detectable contrast between the retroreflective article and the background thereof for certain combinations of retroreflective articles and backgrounds. Combinations of retroreflective articles and backgrounds that provide additional optical contrast when compared to other combinations under such conditions may therefore be more advantageous by providing more robust detection across more lighting conditions.

It is advantageous that a retroreflective article can function sufficiently well in all lighting conditions, for example, because it is not practical for a user of a retroreflective article containing garment to stop and change the particular retroreflective article containing garment when the sun goes under a cloud or moves across the sky, for example.

Optical Contrast Difference

Disclosed optical articles include at least two and in most embodiments a plurality, e.g., more than two, retroreflective elements. The retroreflective elements have at least two different optical contrasts with respect to a background substrate when observed within the ultraviolet spectrum, the visible spectrum, the near-infrared spectrum, or any combination thereof.

The term "ultraviolet" refers to energy having a wavelength in the range from 10 nanometers (nm) to 400 nm. The term "ultraviolet spectrum" refers to the wavelength range from 10 nm to 400 nm.

The term "visible" refers to energy having a wavelength typically visible by the naked human eye and in some embodiments refers to energy having a wavelength in the range from 400 nm to 700 nm. The term "visible spectrum" refers to the wavelength range from 400 nm to 700 nm.

The term "near infrared" refers to energy having a wavelength in the range from 700 nm to 2500 nm. The term "near infrared spectrum" refers to the wavelength range from 700 nm to 2500 nm.

In some embodiments, two different optical contrasts with respect to a background substrate when observed, within the ultraviolet spectrum, the visible spectrum, the near-infrared spectrum, or any combination thereof, can be determined by a measurement technique, observation, or a combination thereof.

In some embodiments, two different optical contrasts with respect to a background substrate, when observed using the human eye, can be determined by viewing the two different retroreflective elements. In some embodiments, two different optical contrasts with respect to a background substrate when observed using a detector or imager can be determined by measuring the optical contrast or at least some component thereof.

In some embodiments, one method of measuring the optical contrast includes the use of a colorimeter. A colorimeter can determine the "color" of both retroreflective elements and it can then be determined if they are different. This can be done using the original colors of the two retroreflective elements or by converting the two retroreflective elements into grayscale and determining if the two colors are different. Such a method can be useful but in some situations can suffer from differences in the number of pixels in a sensor for example. As the number of pixels decreases, the ability to distinguish two different optical contrasts decreases. In embodiments, utilizing a colorimeter, different optical contrast values can be determined by the hardware that is being utilized to measure the optical contrast.

In some embodiments, one method of measuring the optical contrast includes the use of measuring brightness. This method could be useful for retroreflective articles that are meant or particularly advantageous for nighttime only use, as the difference in the brightness could be an overwhelming contributor to the difference in optical contrast. In some embodiments, the luminous flux of the two retroreflective elements can be measured to determine if the optical contrast is different. In embodiments, utilizing luminous flux, different optical contrast values can be determined by the hardware that is being utilized to measure the luminous flux.

In some embodiments, a difference in optical contrast which may be primarily due to brightness can also be determined by a human observer as two different levels of brightness. One relationship between the magnitude of a physical stimulus, of which brightness is an example, and its perceived intensity or strength is given by Steven's power law. The general formula of the law is $\Psi(I)=kI^{\alpha}$, where I is the magnitude of the physical stimulus, $\Psi(I)$ is the subjective magnitude of the sensation evoked by the stimulus, $\alpha$, is an exponent that depends on the type of stimulation, and k is a proportionality constant that depends on the units used. The exponent, $\alpha$ basically indicates how much brighter something has to be for an average human observer to perceive that it is brighter, e.g., that it has a different optical contrast. In some embodiments, a brightness difference of 0.33 times can be perceived by a human observer as brighter when the stimulus condition is a 5° target in the dark; in some embodiments a brightness difference of 0.5 times can be perceived by a human observers as brighter when the stimulus condition is a point source; in some embodiments, a brightness difference of 0.5 times can be perceived by a human observer as brighter when the stimulus condition is a brief flash; and in some embodiments, a brightness difference of 1 time can be perceived by a human observer as brighter when the stimulus condition is a point source briefly flashed.

In some embodiments, one method of measuring the optical contrast includes the use of the Bidirectional Reflectance Distribution Function (BRDF). The BRDF provides the reflectance of a target as a function of illumination geometry and viewing geometry. The BRDF depends on wavelength and is determined by the structural and optical properties of the surface, including for example shadow-casting, multiple scattering, mutual shadowing, transmission, reflection, absorption, and emission by surface elements, facet orientation distribution, facet density, and combinations thereof. The BRDF simply describes, albeit in a complex manner, what is observed by the human eye.

Quantifying the visual contrast between a retroreflective material and the background material thereof under real-world conditions can be somewhat complex. A typical method could include measuring the color of the retroreflective materials (as discussed above). The color of materials is often defined as a simple measurement consisting of metrics that defined a combination of luminance or intensity and chromaticity. An example of such a measurement is CIE 1931 Yxy color space, in which Y corresponds to the luminance, with x and y as chromaticity coordinates defining a specific hue on a chromaticity chart. The color is typically defined for a particular illumination source corresponding to the specific lighting environment (e.g. D65 and F2 used to replicate daylight and a specific fluorescent spectral illumination, respectively). The color can be measured using a colorimeter in which the color is measured under a well-defined orientation for source and reflected light.

However, standard color measurements may not provide a good predictor for whether a retroreflective material would provide good visual contrast in outdoor viewing conditions. The visual contrast between two reflecting opaque objects under different daylight illumination conditions and orientations is typically more complex than a simple comparison of color parameters from a colorimeter. The reflected luminance of the retroreflective material may be the most important factor. However, the degree to which light is reflected depends on the local orientation of the viewer (or detector, in the case of machine vision) and the position of light relative to the surface normal of the materials under illumination. As the orientation of either the illumination, the observer or the reflected material changes, the reflected luminance will change. In addition, the presence of curvature on a garment including natural drape around a human form, as well as the presence of folds, wear, or combinations thereof can create highly non-uniform local reflection geometries with respect to either a human observer or a camera associated with a machine vision.

Bidirectional reflectance distribution function (BRDF) measurements can be made to quantify the angular distribution of the reflected luminance from a sample for several incidence angles to explore reflective optical contrast under a variety of observed conditions. Such measurements can be referred to as Bright Coverage Determination. For photometry, the BRDF is defined as the reflected luminance divided by the incident illuminance and will be referred to as the photopic BRDF. BRDFs have the units of inverse projected solid angle, which is inverse steradian. Each BRDF data point is associated with an incident light direction and a scattered light direction. The scattered directions are specified using the projected angle space which is a circular region with radius 1 in the x-y plane. The z direction corresponds to the direction normal to the sample. Integrating a BRDF over the entire scattered angle space provides the total reflectance (TR). For an arbitrary point in the projected angle space, the distance from the origin is equal to the sine of the inclination angle (angle between the z-axis and the direction of scatter) and the azimuthal angle of the point relative to the x-axis gives the azimuthal direction of the scattered light relative to the x-axis. The advantage of using the projected angle space is that the area of a region in the projected angle space is equal to the projected solid angle. Multiplying the projected solid angle by the average BRDF in the projected solid angle gives the fraction of the incident light that is reflected into this angular region. The projected angle space have coordinates of $u_X$ and $u_Y$, where $$u_X = u^*\sin(\phi) \quad u_Y = u^*\cos(\phi) \quad u = \sin(\theta)$$

θ (theta) is the inclination angle and φ (phi) is the azimuthal angle. The projected angle space will be referred to as $u_X$-$u_Y$ space.

The photopic BRDF can be and were measured for fixed incidence angles. By thresholding the photopic BRDF with a predetermined cutoff value in a specified region in $u_X$-$u_Y$ space (u<)sin(70°) and $u_Y$<0-15°), the percentage of the specified region that is above the threshold can be calculated and can be referred to as the "bright coverage".

In some embodiments, a retroreflective material can be distinguished from a background when the photopic BRDF is below about 0.1±0.05 inverse steradian over a sufficiently large region in the $u_X$-$u_Y$ space. The surface normal direction of the retroreflective material can vary about the body and with the time of day resulting in the sampling of a large region of the $u_X$-$u_Y$ space. If the bright coverage is high, then under sunlight, a larger fraction of the retroreflective material would be bright (higher luminance) and more difficult to distinguish from the bright garment material.

In some embodiments, a difference in optical contrast of two different retroreflective elements can be described by a BRDF cutoff value that is utilized to calculate a bright coverage. For example, a 0.05 bright coverage defines a bright coverage calculated using a BRDF cutoff value of 0.05 steradian. In some embodiments, two retroreflective elements have a different optical contrast when they have a 0.05 bright coverage with a weighted average of less than 50 percent; when they have a 0.05 bright coverage with a weighted average of less than 25 percent; when they have a 0.05 bright coverage with a weighted average of less than 15 percent; when they have a 0.10 bright coverage with a weighted average of less than 50 percent; when they have a 0.10 bright coverage with a weighted average of less than 25 percent; when they have a 0.10 bright coverage with a weighted average of less than 15 percent; or when they have a 0.15 bright coverage with a weighted average of less than 15 percent.

In some embodiments, the retroreflective properties can have at least two different colors as well. In some embodiments, at least some of the retroreflective elements are black and at least some of the retroreflective elements are silver. In some embodiments, at least some of the retroreflective elements are black and at least some of the retroreflective elements are silver and the background or a substrate upon which the plurality of retroreflective elements are located is fluorescent. In some embodiments, at least some of the retroreflective elements are black and at least some of the retroreflective elements are silver and the background or a substrate upon which the plurality of retroreflective elements are located is fluorescent orange or fluorescent lime-yellow.

Retroreflective Properties

The retroreflective elements have at least two different retroreflective properties. The term "retroreflective" refers to the phenomenon of energy (e.g., light rays) striking a surface and being redirected back towards the source of energy. The retroreflective nature of an element can be caused by illumination with any source of energy. In some embodiments, the retroreflective nature of an element can be caused by a natural source (e.g., the sun, the moon, etc.); or a non-natural source (e.g., headlights, streetlights, etc.).

The plurality of retroreflective elements include elements having at least two different retroreflective properties. In some instances, the at least two different retroreflective properties are at least two different retroreflective intensity values. In some instances, the at least two different retroreflective properties are at least two different wavelengths of reflection. In some instances, the at least two different retroreflective properties have at least two different polarization states. In some instances, the at least two different retroreflective properties at least two different phase retardations. In some embodiments, the at least two different retroreflective properties are at least two different retroreflective intensity values, at least two different wavelengths of reflection, at least two different polarization states, at least two different phase retardations, or some combination thereof.

Observed in Ultraviolet Spectrum, Visible Spectrum, Near-Infrared Spectrum or Both In some embodiments, the optical articles, the optical contrast thereof, or some combination thereof can be observed by a system capable of observation thereof in the ultraviolet spectrum. In some embodiments, the optical articles, the optical contrast thereof, or some combination thereof can be observed by a system capable of observation thereof in the visible spectrum In some embodiments, the optical articles, the optical contrast thereof, or some combination thereof can be observed by a system capable of observation thereof in the near-infrared spectrum. In some embodiments, the optical articles, the optical contrast thereof, or some combination thereof can be observed by a system capable of observation thereof in some combination of the ultraviolet spectrum, the visible spectrum, and the near-infrared spectrum. In some embodiments, the optical articles, the optical contrast thereof, or some combination thereof can be observed by a system capable of observation thereof in some combination of the visible spectrum and the near-infrared spectrum, the visible spectrum, or the near-infrared spectrum.

Being observed herein can include being perceived, visualized, viewed, imaged, detected, monitored, or any combination thereof. The observation can be undertaken by a human observer; a machine or computer observer, imager, detector, visualizer, or a combination thereof; or by a combination of a human and a machine.

Machine observers can include at least a camera. An example of an RGB camera system includes, for example, a FLIR Machine Vision (formerly Point Grey) CHAMELEON®3 5MP Color Camera (CM3-U3-50S5C-CS) (FLIR Integrated Imaging Solutions Inc., Richmond BC, CANADA). The camera system may be modified with lens' of varying focal length, including, for example an Edmund Optics 25 mm C Series Fixed Focal Length Lens (Edmund Optics Inc. Barrington, N.J.). Illustrative light sources for RGB camera systems may be either ambient illumination or automobile headlights. An example of an NIR camera system includes, for example, a FLIR Machine Vision (formerly Point Grey) CHAMELEON®3 5MP Color Camera (CM3-U3-50S5C-CS) (FLIR Integrated Imaging Solutions Inc., Richmond BC, CANADA). The NIR camera system may be modified with lens' of varying focal length and/or filter, including, for example, an Edmund Optics 25 mm C Series Fixed Focal Length Lens (Edmund Optics Inc. Barrington, N.J.), a BN940 Narrow Near-IR Bandpass Filter (BN940-25.5) (Midwest Optical Systems, Inc. Palatine, Ill.), or combinations thereof. Illustrative light sources for NIR camera systems may include a 130 mm Over Drive Ring Light 940 nm IR—"EZ Mount Ring Light" from Smart Vision Lights (Muskegon, Mich.).

Disclosed retroreflective articles can be advantageous because they can offer observation to both human and machine observers in a number of different environmental conditions, whether or not a portion of the retroreflective article is occluded.

Angular Sensitivities

In some embodiments, the plurality of retroreflective elements can have at least two different angular sensitivities as well. The different angular sensitivities results from the retroreflective property of the retroreflective material. Various combinations of retroreflective elements can be utilized to create a pulsing effect, not create a pulsing effect, or a combination thereof; a flickering effect, not create a flickering effect, or a combination thereof; or a combination thereof. A pulsing effect is caused in part by overglow, as one retroreflective element ceases to reflect, the overglow of the brighter retroreflective element (at that particular angle) appears to get brighter, e.g., pulse. As the angle of the incident light changes (either by the article moving or the light source moving, or both), one or more of the retroreflective elements will have a change in retroreflectiveness. In some embodiments, the plurality of retroreflective elements can produce a pulsing effect when illuminated with a source of energy. The pulsing can be advantageous because it can distinguish one object from another, an object from a human, or two other types of objects.

Different angular sensitivities can be combined with different shapes, different sizes, different patterns, or any combinations thereof to create different types of effects, including for example pulsing, blinking, a strobe light effect, a flickering, etc. Because of the different off-angle retroreflective properties of the materials, different angles can create different appearances of the overall article. For example, at head on angles, where all materials reflect well, the full array is seen while at angles further to the side from head on (off angles) materials with low off-angle retro reflectivity do not reflect much therefore such retroreflective elements appear to disappear at off angles. Different patterns, such as checkerboard, bullseye and columnar patterns were investigated and can provide different effects, such as those seen below in the examples.

Different angular sensitivities of at least two retroreflective elements can also be utilized when observed (by a machine observer, a human observer, or both) to infer the location, angle, etc. of the observer with respect to a fixed object. For example, different angular sensitivities can be used to determine the distance an observer is from an object because the angular sensitives are distance dependent, in that the effect (e.g., flickering, pulsing, etc.) occurs only within a distance range from the retroreflective element.

Spatially Defined Arrangement

The present disclosure provides an optical article comprising a data rich plurality of retroreflective elements that are configured in a spatially defined arrangement.

The term "data rich" as used herein means information that is readily machine interpretable.

At least some of the retroreflective elements are discontinuous. In some embodiments all of the plurality of retroreflective elements are discontinuous. By discontinuous, it is meant that the edges of the retroreflective elements do not contact each other and the retroreflective elements do not overlap.

In some embodiments, the data rich plurality of retroreflective elements are configured in a repeating spatially defined arrangement such that the information is interpretable even when the portion of the retroreflective elements are occluded. In some embodiments, at least some of the plurality of retroreflective elements are discontinuous. In some embodiments, most of the plurality of retroreflective elements are discontinuous. In some embodiments, all of the plurality of retroreflective elements are discontinuous.

FIG. 1a illustrates the effect of occlusion and pattern replication. The upper-left quadrant shows a sample base pattern of retroreflective elements. In this example, imaging that the pattern is identifiable if both of the circles are visible; the upper-right quadrant shows the same base pattern with one replication; in the lower-left quadrant of FIG. 1a a white object has occluded one of the elements in the pattern. In this case, the occlusion results in an inability to detect the pattern. In the lower-right quadrant once again a white object is occluding one of the elements of the pattern but due to the replication there are still sufficient elements for detection of pattern of the optical article by a system, such as a visions detection system. Various patterns of retroreflective elements can be used in the present disclosure, such as the exemplary designs shown in FIGS. 1b to 1m.

In some embodiments, a particular spatially defined arrangement can be utilized to classify the entity (e.g., user or object) that the retroreflective article exists upon. If the classifier in a system, such as a vision detection system, is based on checking the number of retroreflective elements in the pattern against a minimum required number of retroreflective elements, a pattern containing at least one more element than the specified minimum will be detectable under partial occlusion. In comparison, a classifier in a system, such a vision detection system, looking for a specific number of retroreflective elements is not robust when at least one of the retroreflective elements in the pattern is occluded.

The present disclosure also provides that the plurality of retroreflective elements can have the same or different shapes. Useful shapes for individual retroreflective elements includes, but are not limited to, circles, stars, squares, polygons, curved and irregular shapes, and the like. These individual retroreflective elements can be arranged in a mathematical way of arranging shapes such that the arrangement can be detected independent of the individual component shapes, optionally the individual component shapes could add additional information. Mathematical arrangement refers to a scheme for sizing and spacing apart the components of the resulting optical article.

These retroreflective elements or resulting optical articles may be either standalone or may be repeating to increase robustness to partial occlusion. If the elements or articles are small, repetition may be required for robust detection, if the optical article is large it is likely to be robust to partial occlusion due to a subset being visible.

Optionally any number of the component shapes could be engineered to selectively reflect light of different wavelengths and/or polarization. For example, in some embodiments, retroreflective elements with properties sufficient to meet regulatory standards (e.g., ANSI/ISEA 107-2015' compliant material) but a subset of the optical article is constructed such that it has special optical properties (e.g., wavelengths and/or polarization reflected) such that a system (such as a computer vision system) can discriminate between these sections of the optical article and the rest of the optical article or objects on which it is mounted. One example of the utility of such a construction might be, if to be regulatory compliant gaps in the retroreflective elements had to be less than X mm, but computer vision system detection necessitated gaps greater than X mm. These two requirements would be in conflict unless the construction of the retroreflective elements allowed the computer vision system to only see a subset of the retroreflective elements but the entire (or at least a portion of the optical article or retroreflective elements) is sufficient to meet standards because the resulting optical article is reflective to light in a spectrum that is detectable by humans.

In some embodiments, the number of unique retroreflective elements in the optical article, should be robust to deformation and perspective changes up to the point where retroreflective elements become completely occluded or they begin to merge together versus density of bright pixels.

The spacing and feature size of the retroreflective elements (or shapes) comprising the optical article will likely need to factor in over-glow. One optional construction of the present disclosure might include retroreflective elements that are constructed of more than one level of reflective material so as to reduce effect of over-glow. For example, the outer edge of the retroreflective elements might be constructed from lower $R_A$ material as compared to the internal portion of the retroreflective elements. In some embodiments, a minimum measured difference in $R_A$, such as at least a difference of 5%, 10%, 20%, 50% or more, is useful.

The retroreflective elements can be manufactured by any number of methods including but not limited to: screen printing, weaving, stitching, and the like.

In some embodiments, the optical article is a deformable optical article. In some instances, the deformation is caused by shrinkage, expansion, or both. In some instances, the deformation causes a spacing change between at least two of the retroreflective elements. In some instances, the deformation is reversible.

In some instances, the aforementioned retroreflective property changes in response to a change in condition. For example, a change in condition that could cause a change in at least one of the retroreflective properties of the plurality of retroreflective elements could be a change in thermal, moisture, mechanical deformation, or radiation. Thermal changes could be changes in ambient temperature, for example. Exemplary moisture changes include changes in ambient humidity or the presence of precipitation in an environment in which the optical article is being used. Mechanical deformation could include, for example, wrinkling of a garment on which the optical article is mounted.

In some instances, the retroreflective elements are individually sized and separated from one another such that each individual retroreflective element is resolvable at desired distances from the optical article.

In some instances, the spatially defined arrangement comprises geometric arrangement in which the retroreflective elements are positioned with a distance from their neighboring retroreflective elements, and wherein the retroreflective elements have a periodicity from one element to another within the spatially defined arrangement. In some instances, the periodicity is a regular periodicity. In some instances, the periodicity is an irregular periodicity. In some instances, the spatially defined arrangement is rotationally insensitive.

In some instances, a number of geometric arrangements are required per spatially defined arrangement depends on a required quality of fit. In some instances, the retroreflective elements are positioned from their nearest neighboring retroreflective elements by a characteristic distance. In some instances, the retroreflective elements have a characteristic ratio of size to distance to neighboring retroreflective elements that is invariant with viewing angle.

In some instances, the optical article further comprises a printed layer disposed on the outer surface of at least a portion of the retroreflective elements. In some instances, the retroreflective properties are detectable in the infrared spectrum.

In some instances, the optical article is disposed on a substrate selected from at least one of objects, infrastructure, wearables, and vehicles. The present disclosure provides a fabric comprising the aforementioned articles.

System Including Retroreflective Article

The present disclosure also includes a system comprising any of the aforementioned articles, an optical system, and an inference engine for interpreting and classifying the plurality of retroreflective elements wherein the optical system feeds data to the inference engine. In some instances, the article is disposed on at least one of objects, infrastructure, targets, wearables, and vehicles.

In some instances, the optical system is part of a vehicle, and further wherein the vehicle uses the information as an input to an autonomous driving module. In some instances, the vehicle uses the information to provide human language feedback to the driver. In some instances, the vehicle uses the information to provide at least one of haptic, audible or visual feedback to the driver.

In some instances, the data rich plurality of retroreflective elements is visible in the infrared spectrum to a computer vision system. In some instances, the information related to the data rich plurality of retroreflective articles comprises at least one of road workers expected, pedestrians expected, construction workers expected, students expected, emergency responder workers expected.

In some instances, the inference engine is locally stored as a component of the optical system. In some instances, the optical system communicates with the inference engine using a wireless communication protocol. In some embodiments, the inference engine and the optical system can include various features and steps as disclosed in the following section on methods and systems useful in the present disclosure.

The presently disclosed system is useful for various applications. For example, the presently disclosed system utilizes the presently disclosed optical article for the purpose of simplifying and enhancing detection capabilities of a system, such as a computer vision pedestrian detection, which allows for the system to determine location, identification, and/or pose of an individual wearing a garment, accessory or other objects on which the optical article is disposed. The data rich content in the plurality of retroreflective elements aids in simplification of the task of pedestrian detection by reducing the number of distractors that the optical system needs to evaluate by first thresholding the image based on properties of the optical (such as, for example, intensity and/or color spectrum of the light returned) and then evaluating those segmented regions for meaningful shapes (or patterns) based on the design of the garment, accessory or other article on which the optical article is disposed and likely poses of the wearer.

Figure 2A:
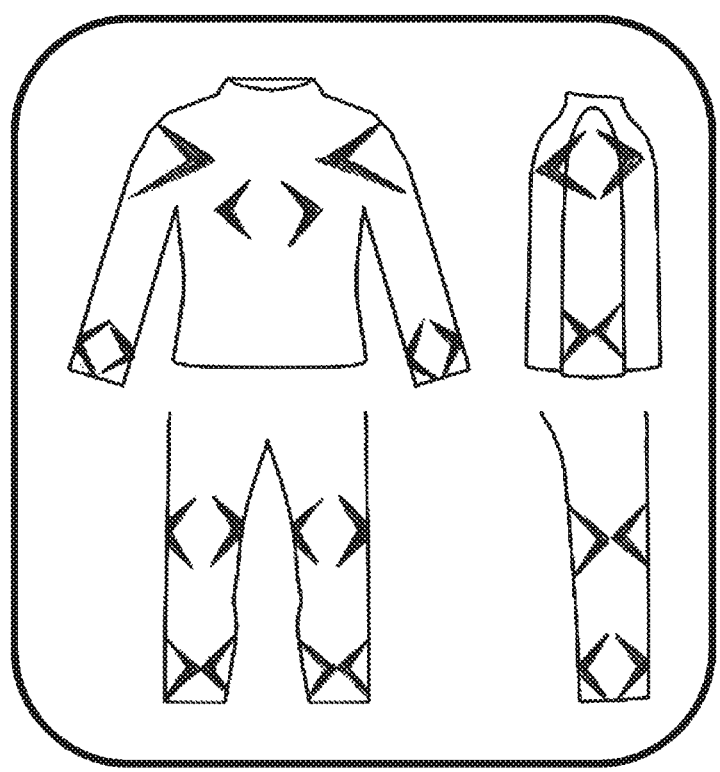
FIGS. 2a and 2b show the presently disclosed optical articles disposed on an objects.
Figure 2B:

The presently disclosed system includes at least one camera, a light source (such as, for example, vehicle headlights, or other visible, NIR, or FIR light sources), and the presently disclosed optical articles. The presently disclosed system utilizes the pattern of light returned from the optical article to identify the object on which the optical article is disposed, infer pose, position, likelihood of intersection, etc. One possible embodiment might utilize a garment design, such as those illustrated in FIGS. 2a and 2b. In this example, a frontal view of the garment has a different number and pattern of visible optical articles having a plurality of retroreflective elements than a profile view of the garment. If the optical articles on the garment are of a known size (for example, if the chevrons in this case are all 6 inches in length) then the system could infer relative distance and position of the wearer from the camera based on projected size and position.

The present disclosure includes a system and method for automatically evaluating the saliency of design shapes, such as optical articles and a plurality of retroreflective elements included therein, for an application environment without having to collect real world data (images/videos) of such shapes.

Figure 3:
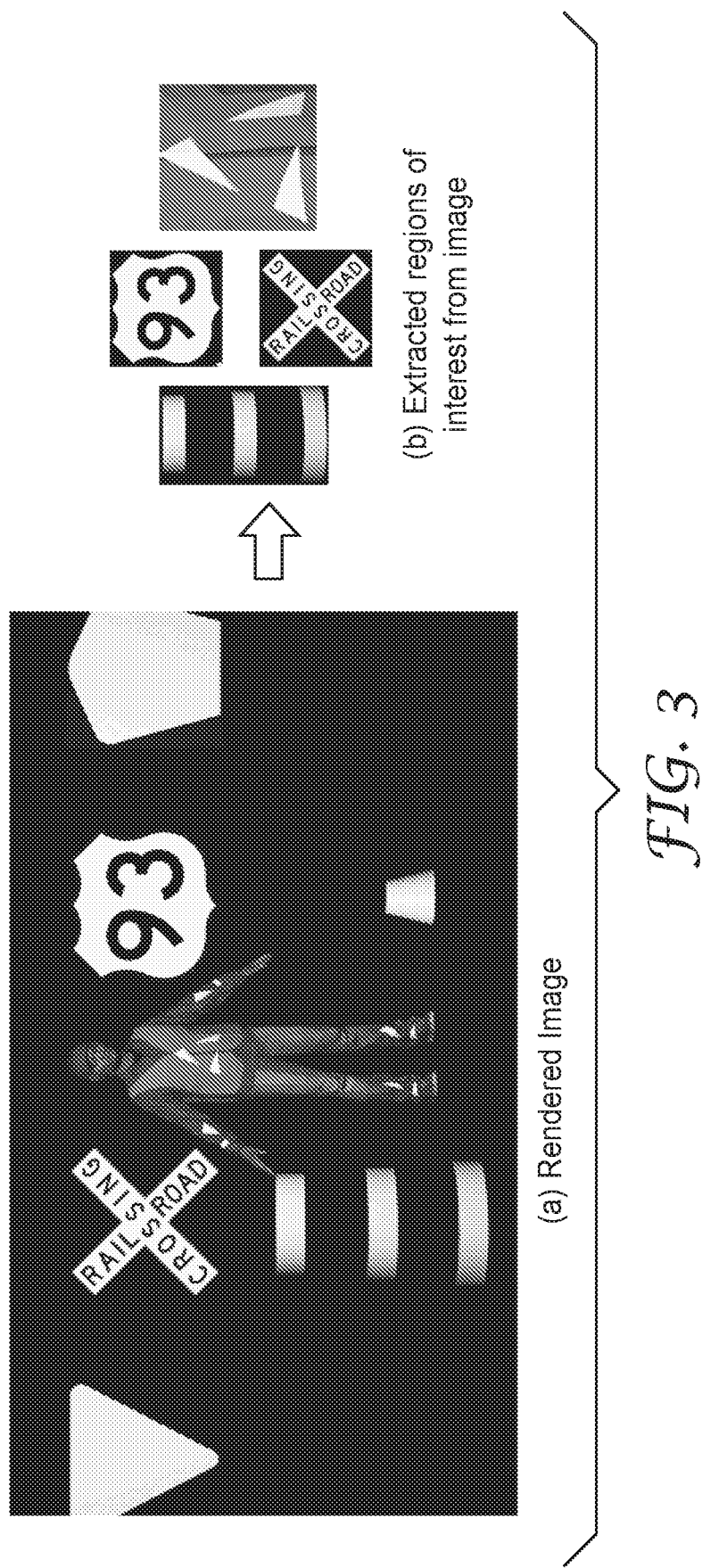
FIG. 3 shows a rendered image of an environment including the shape in presence of distractors produced by a software and an automatic extraction of the regions of interest (ROI) for the shapes from the synthetically generated image according to some embodiments of the presently disclosed system.

The sequence of steps to perform this methodology is depicted in FIGS. 3a and 3b; and described here:

The input to the system is the shape of interest, such as optical articles and a plurality of retroreflective elements included therein. For the application environment, a set of distractor shapes (or objects) which commonly occur in the environment is known e.g. for a highway application, the distractor set can include highway information sign, speed limit sign, cones, barrels, and the like.

The design shape (such as optical articles and a plurality of retroreflective elements included therein) placed on an object of interest (such as infrastructure, garments, accessories, and the like) and distractor set is input into an algorithm or software for generating a synthetic dataset of images and videos. This includes, but is not limited to, a render software which uses a 3D model of the environment to produce a rendering of the object in that environment. This will generate data which can simulate effects like lighting effects, viewpoint variations, environment clutter, object motion, and the like. FIG. 3a shows a sample rendered image of a highway worker wearing a high visibility garment with an exemplary optical article of the present disclosure as the design shape in the frontal portion of his garment.

The regions of interest (ROI) corresponding to the design shape (e.g., optical articles and a plurality of retroreflective elements included therein) and the distractor are extracted from the images. FIG. 3b shows one such example of ROIs extracted from a rendered image. This process can be automated using knowledge about the 3D model provided for the rendering of the environment.

For each extracted ROI, features characterizing their properties like appearance, shape, texture, geometry are computed e.g. shape context, histogram of oriented gradients, area, etc.

Figure 4:
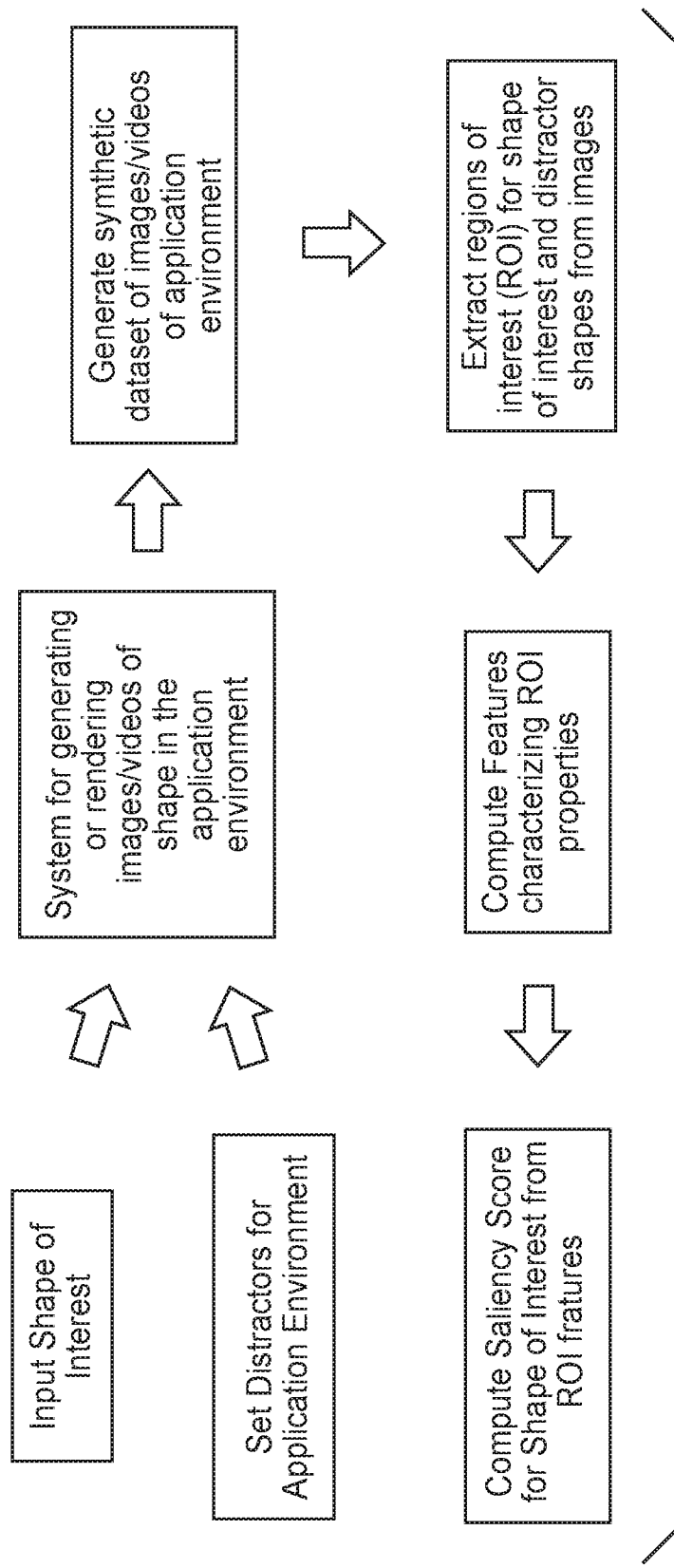
FIG. 4 depicts a flowchart describing the steps for evaluating the saliency of an input shape using synthetically generated data according to some embodiments of the presently disclosed system.

The computed features can then be input into an algorithm, an example of which is shown in FIG. 4, that can generate the saliency score for the design shape (e.g., optical articles and a plurality of retroreflective elements included therein) against the set of distractor shapes. The saliency evaluation generates a quantitative score for the design shape's uniqueness amongst the set of distractors.

The present disclosure also provides a system and method that modifies retroreflective shapes (such as optical articles and a plurality of retroreflective elements included therein) on objects of interest (such as infrastructure, garments, accessories, and the like) to provide additional information. In this invention, the object of interest is also referred to as a carrier pattern. Exemplary objects of interest, or carrier patterns, include a high-visibility safety vest worn by workers in work-zones, barrels used in roadside construction zones to mark navigation limits, and other infrastructure, garments, accessories, and the like. The sequence of steps to perform this methodology is described here:

Annotated images of the carrier pattern are collected for the environment. These include the images of objects from varying distances, poses and viewpoints. As an example, FIG. 5 includes examples of retroreflective vests worn by individual workers in workzones.

A machine learning model can be trained to classify image patches as the carrier pattern or not. To train this model, image patches of the carrier pattern and the background (image patches which do not include the carrier pattern) are provided. Image features characterizing the appearance of these image patches like a histogram of oriented gradients (HOG) or shape context are computed. These features are then used to train a classifier model e.g. Support Vector Machine (SVM) or Decision Trees. The input to this model is the computed feature for an image patch and the output can be (but not limited to) yes/no answer for presence of the carrier pattern in the input image patch.

Figure 6C:
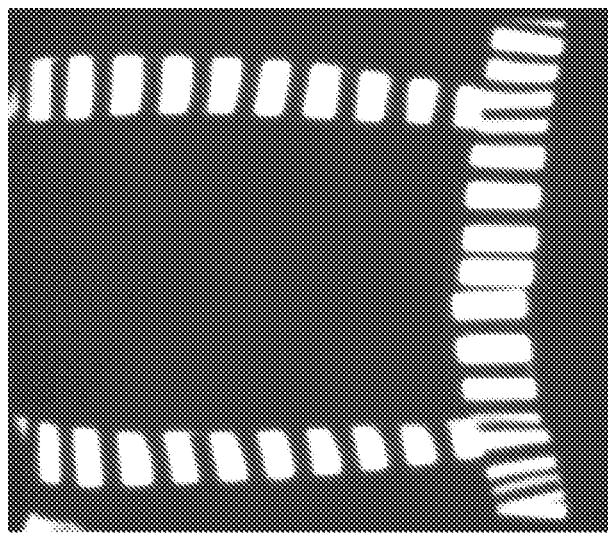
FIG. 6 depicts an exemplary modifications to a carrier pattern. The carrier pattern is shown in (a). A modification to the pattern can include a gap introduced into the middle of the strips as shown in (b) or repeating gaps in the form of a segmented trim like that shown in (c).
Figure 6B:
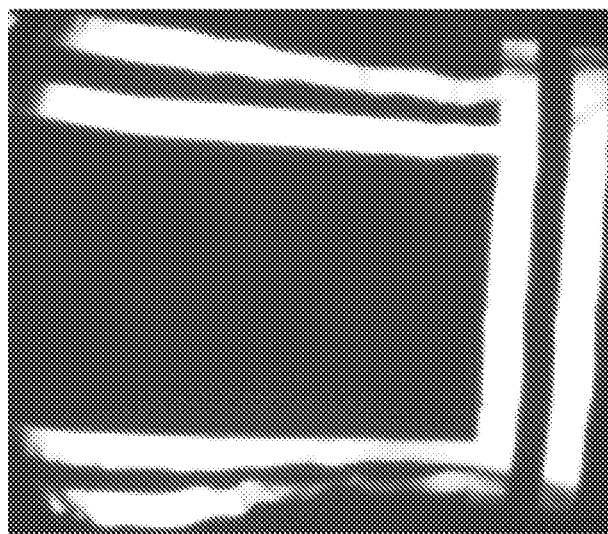
Figure 6A:
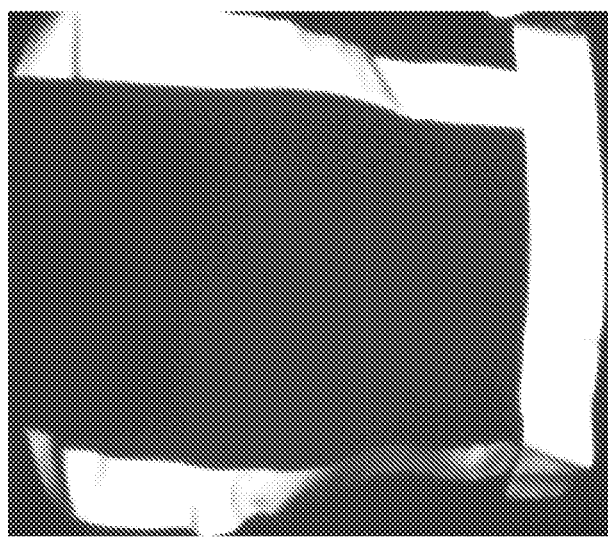

Given a carrier pattern and based on the requirements of the system for the environment, modifications are made to the retroreflective shape of the carrier pattern. An example is provided in FIGS. 6a, 6b and 6c where the H-shape used in safety vests is partially modified to produce two additional sub-categories of the pattern. The modifications are not just limited to size and could include changes to the color of the pattern also.

Figure 7:
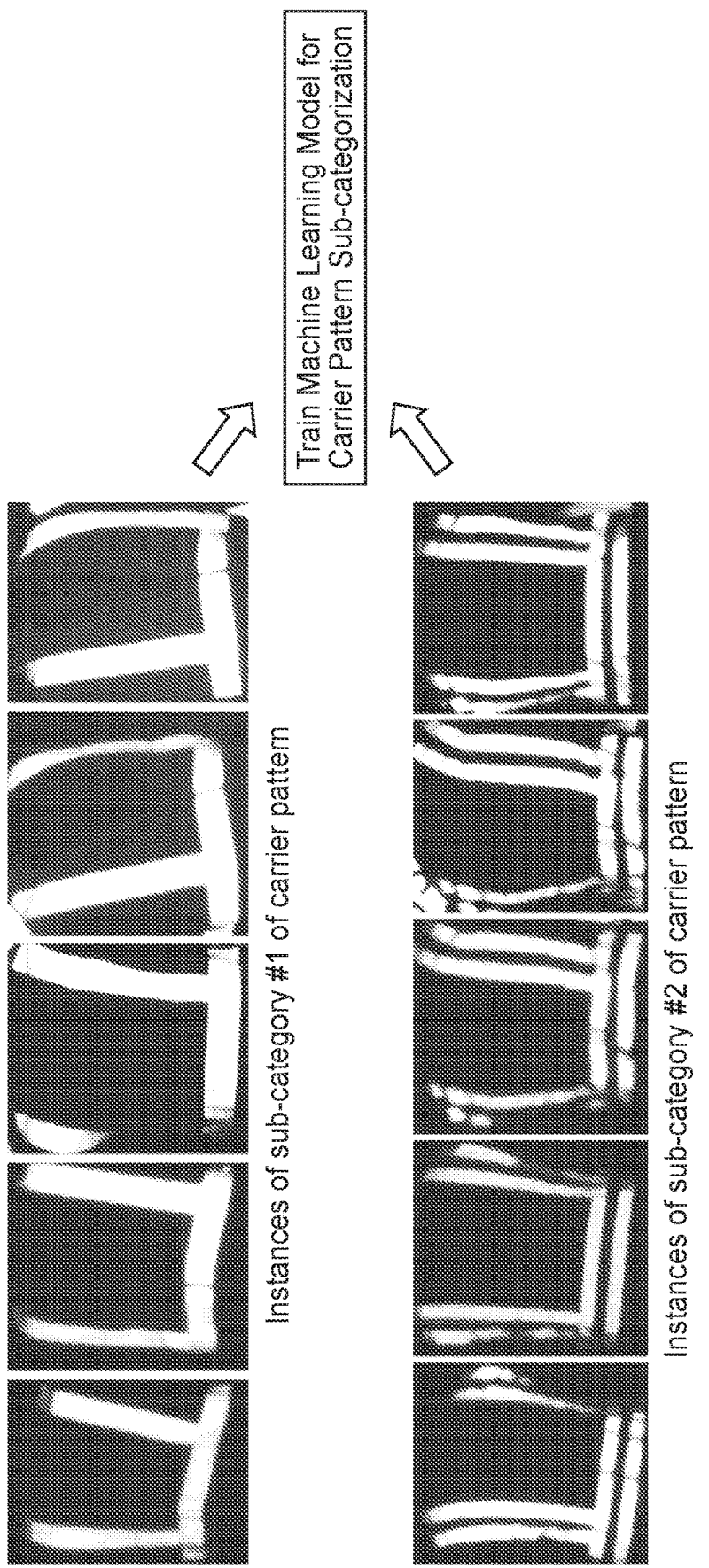
FIG. 7 depicts images of instances of different sub-categories of the carrier pattern.

Images of the different sub-categories are collected in a data collection experiment or through a synthetic data generation module. Besides collecting images of the different sub-categories individually, it is also possible that the carrier pattern image already include instances of the sub-category and a clustering algorithm can be used to discover these instances A sub-categorization classifier is trained using instances of the different subcategories as shown in FIG. 7.

At runtime, the system first looks for the presence of the carrier pattern. Having detected the carrier pattern in an image patch, that image patch is then processed by the subcategorization module for the sub-category present in the image. Examples are provided in FIG. 8a and FIG. 8b.

In some embodiments, the presently disclosed system also provides or includes two algorithms that are used to 1) initialize the boundary of a shape of an optical article that is placed on an object of interest, such as a garment and 2) define an objective function that measures the usefulness or fit of that boundary configuration. Each of the algorithms searches the space of possible geometries and yields a geometry that optimizes that objective function.

Figure 9:
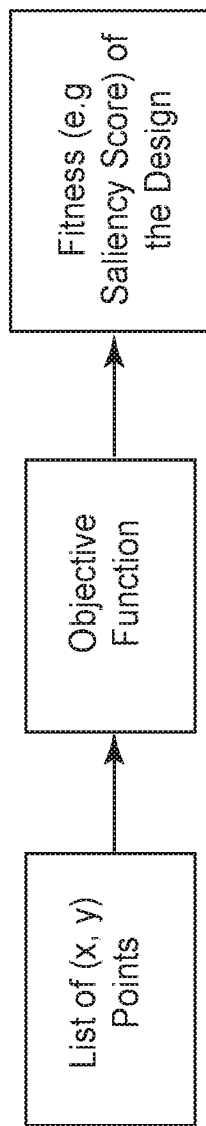
FIG. 9 shows an overview of an evaluation process of possible shape arrangements useful in algorithms that can be used in some embodiments of the presently disclosed system.

FIG. 9 illustrates the process of evaluating each possible geometry (parameterized as a set of [x, y] points). In some embodiments, one of the algorithms is a genetic algorithm and the other algorithm is a numerical gradient-based optimization algorithm. Each of these algorithms uses a different technique to generate sample geometries, evaluate them, and attempt to further generate new arrangements with improved evaluation scores.

Figure 10:
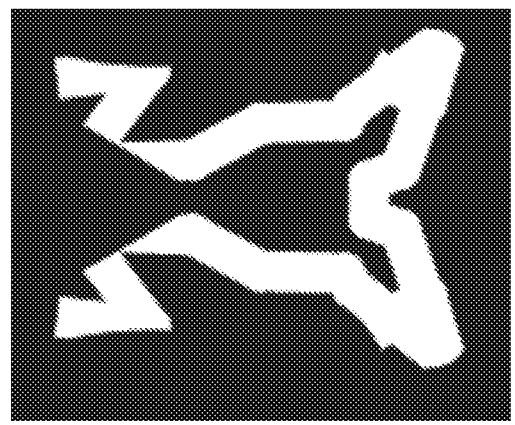
FIG. 10 shows a design with a fit (or saliency) score of 0.752332, produced after 1484 generations of the genetic algorithm useful in some embodiments in the presently disclosed system.
Figure 11:
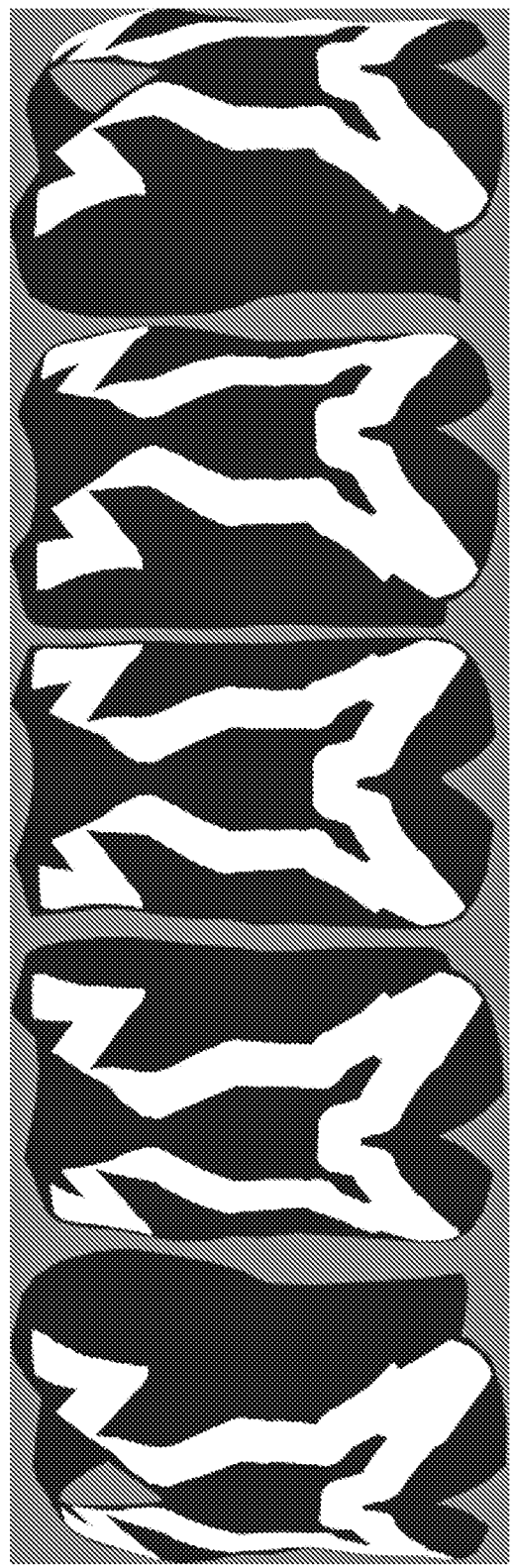
FIG. 11 shows the design from FIG. 10, rendered onto 3D vest model by an algorithm useful in some embodiments in the presently disclosed system.

In some embodiments, the plurality of retroreflective elements are placed in configurations that produce designs, such as garment designs, which are highly salient to a system, such as systems used by motorists (see FIG. 10). The term "highly salient" as used herein means something that stands out from other entities or features in an environment. The objective function assesses the saliency of a design by applying that design as a texture to a 3D model of a vest (e.g., the kind of vest worn by a construction worker). A 3D Modeling application (e.g., Blender) is used to produce several different views of this 3D model (see FIG. 11). The resulting views are fed into a clustering algorithm, as well as a set of 'distractor' shapes. The distractor shapes depend on an application space. In some embodiments, distractor shapes are objects that can be confused as the object of interest in the presently disclosed systems and methods. The clustering algorithm groups these inputs into clusters.

In some embodiments, clustering accurately sorts each of these designs into one cluster and each of the distractor shapes into the other cluster. This results in a fitness of 1.0. Fit can be quantified by 'Silhouette Score', which measures the quality of a set of clusters, based on known ground truth labels. In other words, Silhouette Score is used to measure how well the clustering algorithm performs. There are other potentially useful methods of quantifying the quality of a set of clusters.

In some embodiments, a SciPy optimization toolkit for Python can be used to produce a design as a part of our proof-of-concept experiment, where an objective function that generated circular shapes is used. The SciPy function is called scipy.optimize.minimize. This function is supplied with 1) a list of [x, y] points that define the starting configuration of the boundary of the polygonal shape of the design (such as an optical article using a plurality of retroreflective elements), 2) an objective function that quantifies the cost of a particular configuration of this design, with lower values being better 3) a specification of which optimization method to use for the optimization, and 4) a list of shape or size constraints.

Figure 12:
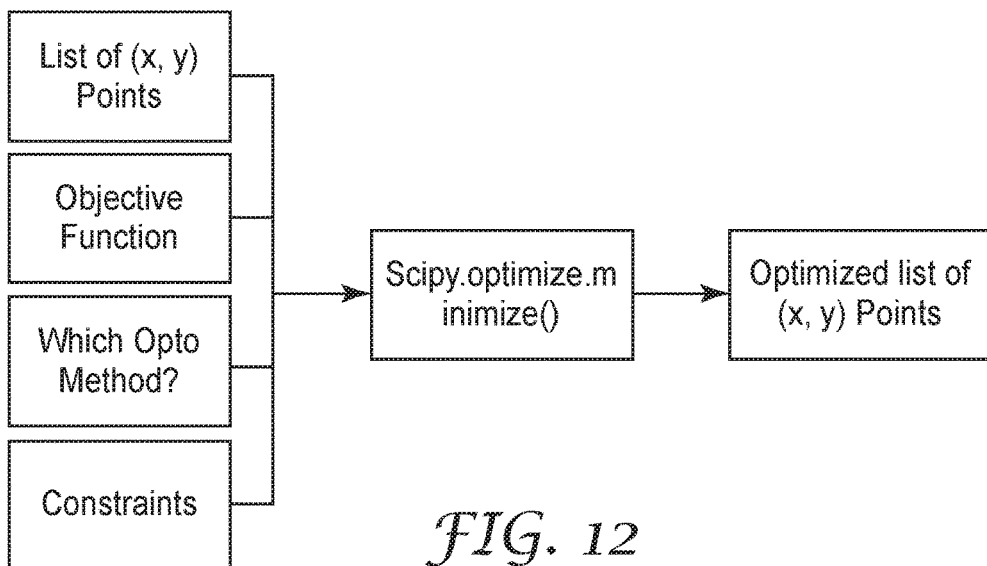
FIG. 12 shows an exemplary function that can be used for optimizing designs in the presently disclosed system.

In some embodiments, the Optimization Method is chosen from a list of options in the documentation (e.g. Sequential Least Squares Programming). The Constraints might be defined to constrain any or all of the constraints listed in FIG. 12. A genetic algorithm can be used to determine a possible data structure. The data structure can be called a chromosome (with an analogy to the container of genetic material in a living system).

The genetic algorithm generates multiple chromosomes (either completely randomly or by making random variations on a seed design). The fitness of each chromosome is then determined. The chromosomes with poor fitness are deleted and replaced with copies of the highly fit chromosomes. The new copies are modified using mutation operators. A mutation operator applies stochastic changes to some of the values in the chromosome. The copies may be produced using an operation called crossover, whereby each child gets genetic material from multiple parents, though crossover is not always required.

In some embodiments, the chromosome is a list of points. Each point defines the vertex of a shape comprising the optical article having a plurality of retroreflective elements. The genetic algorithm favors geometries with high fitness (e.g., in this case, with fitness that is most nearly equal to 1.0). Geometries with high fitness tend to stay in the population, and geometries with low fitness tend to be excluded from the population due to the selection operation.

Figure 13:
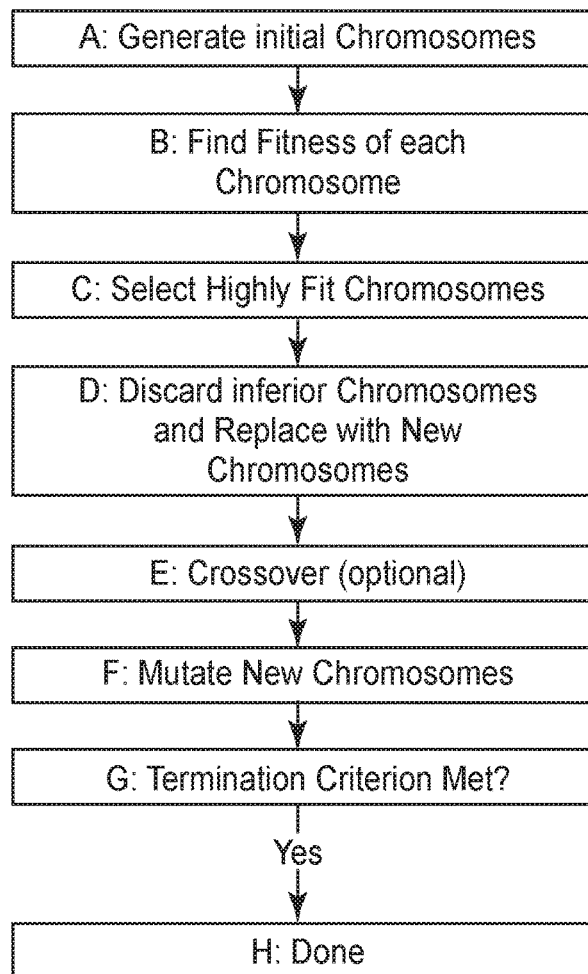
FIG. 13 depicts an exemplary genetic algorithm useful in some embodiments in the presently disclosed system.

FIG. 13 describes the genetic algorithm (GA). The population of chromosomes can be initialized randomly or initialized using pre-evolved chromosomes. The population may alternatively be initialized using the top N most-fit chromosomes from a set of thousands of randomly generated chromosomes. Similarly to the numerical optimization algorithm, the genetic algorithm uses the saliency objective function. The objection function can be modified to impose either hard or soft constraints on the design. Hard constraints guarantee compliance by the design. Soft constraints are used by the GA to "nudge" designs toward desirable attributes, but do not entirely preclude outlier designs.

1) Height and Width
2) Area (minimum and/or maximum—to comply with regulatory standards)
3) Presence of retroreflective elements in certain areas (i.e. to enforce presence of material on the shoulders for ANSI standards compliance)
4) Apply a mask to the design, to define the region of vest The chromosome with the lowest fitness is replaced with copies of the chromosomes that have the highest fitness. See Steps C and D in FIG. 13. This can be done in various ways. In some embodiments, Single Tournament Selection is used with a tournament size of 4. This approach requires random assignment of each chromosome to a group of 4. The two inferior chromosomes are replaced with copies of the two superior chromosomes in that group. These copies may be exact replicas of the two superior parents or each child may be created using some genetic material from each parent. This later approach is called crossover (see Step E in FIG. 13). The children are then mutated (see Step F in FIG. 13). In the case of our proof-of-concept implementation, mutation involves randomly perturbing one or more [x, y] vertices in our chromosome.

Finally, determination is made as to whether the termination criterion has been met (see Step G in FIG. 13). Termination of the algorithm can be done after a predetermined number of generations.

Figure 14:
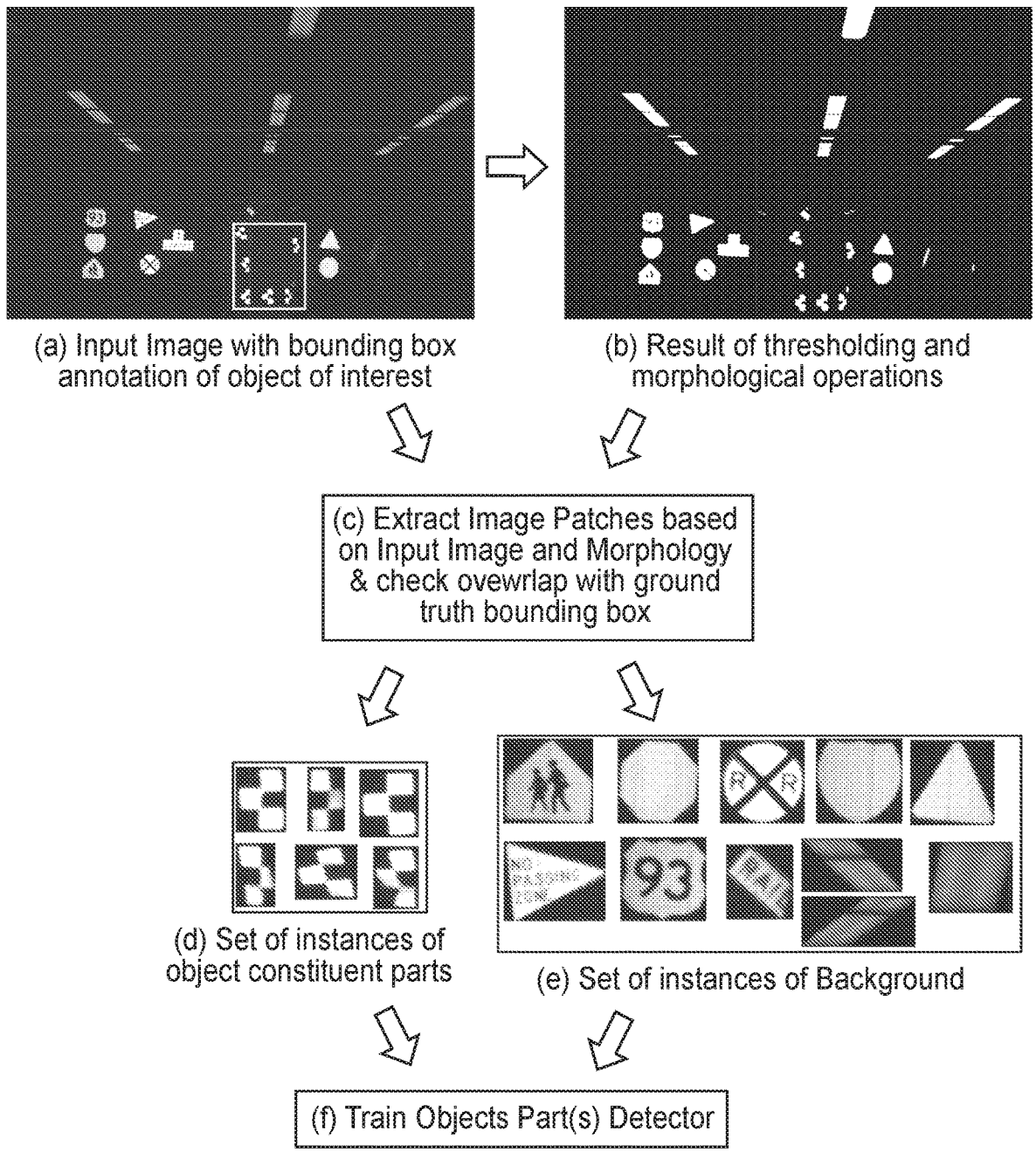
FIG. 14 depicts an embodiment for a workflow for a single image instance useful in some embodiments in the presently disclosed system.

The present disclosure also provides a system and method to exploit retroreflection for training of an object part detector. The term "object part detector" as used herein means a detector that can find individual parts of an object in image/video instead of finding the whole object itself. Optical articles with retroreflective properties appear bright in images where a light source is projected on them. Therefore, when images of these optical articles are intensity-thresholded, the object may appear as a connected component in the resulting binary image. In the present disclosure, this property is used to segment (if there are any) parts of an optical article. The sequence of steps to perform this methodology is described here and a sample workflow for a single instance of the optical article is depicted in FIG. 14.

An input image is provided. The image is annotated with the bounding box location of the entire object of interest (such as an optical article) (as shown in step (a) in FIG. 14). Note that the annotation does not include any information e.g. count or location of the parts of the object. Intensity thresholding and morphological operations like closing which includes dilation and erosion are carried on the image. These provide binary image (images if run for multiple thresholds) where connected components provide image patches. The set of image patches can be separated into two sets—all image patches which do not have any overlap with the bounding box annotation and constitute the background (as shown in step (e) in FIG. 14). The other set includes patches with some overlap with the ground truth annotation (as shown in step (d) in FIG. 14). The set of patches with overlap can be pruned by using a sizing heuristic to eliminate noisy patches left behind as an artifact of morphology. The set of constituent parts can include a pattern repeated across the object (as shown an example in step (a) in FIG. 14) or different parts. These can be discovered by a clustering algorithm which can determine the number of parts of the object. The number of constituent parts may be provided through human supervision also. Finally, a detector model is trained for the discovered constituent part of the object (as shown in step (f) in FIG. 14). This model is trained to detect a specific part of the object of interest in a scene.

In some embodiments, a potential method of characterization of the presently disclosed optical articles having a plurality of retroreflective elements includes a distribution function. For example, it might be characterized in terms of retro-reflective elements or features (reflecting a given wavelength and/or polarization potentially with a particular intensity) with a certain distribution of sizes and a certain distribution of spacing and relative position of the component elements. This type of characterization might be utilized to enable additional capabilities such as object classification (e.g., one characterization associated with one class of object and another characterization associate with a second class of object) or to enable product authentication. It could also be characterized by a distribution generated from a non-dimensional ratio determined from the constellation. For example the size of a node divided by the distance to the next closest node.

In the present disclosure, only a portion of the optical article that is sufficient to accurately sample the distribution is required for categorization. For example if an optical article contains many elements, X, that are part of the constellation, only a small number of visible elements, n, may be required for a statistically significant sample of the population (i.e. $n \ll X$.) This will improve the robustness of the categorization when the view of the article is partially occluded or distorted.

The presented disclosure also provides a system and method to exploit retroreflection for part based detection. The system combines two properties of optical articles, particularly with retroreflective properties: under certain morphological operations on an intensity thresholded image of an optical article, the resulting connected components is likely to include the whole object that certain optical articles are composed of constituent parts or may be modified to be a composition of repeating parts and some of these parts would be visible when the optical article is partially visible in its pose or occluded by other objects.

Figure 15:
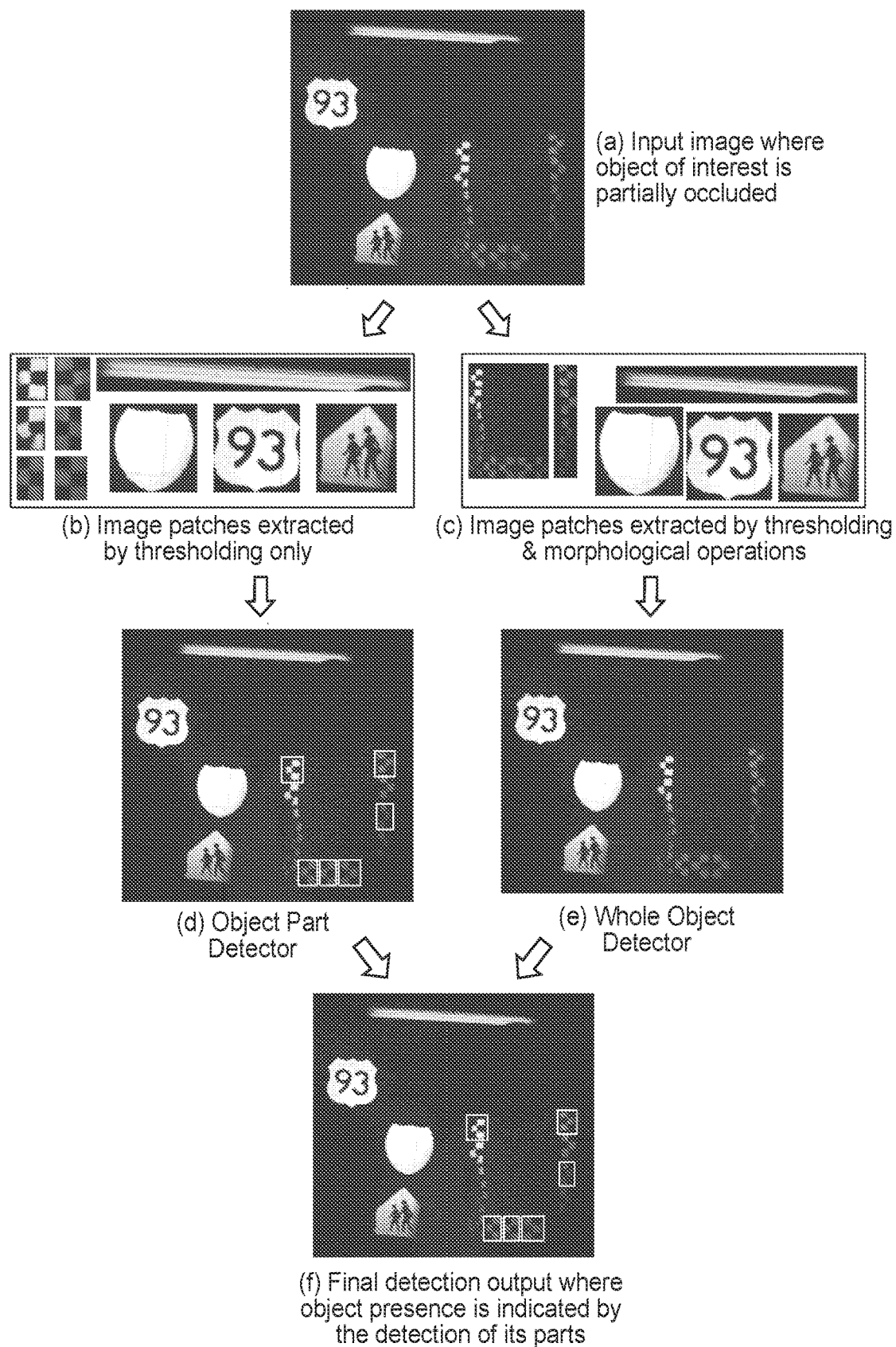
FIG. 15 depicts an embodiment for a workflow for an input image useful in some embodiments in the presently disclosed system.

These two properties can be used by running a monolithic detector to search for the complete object of interest (such as infrastructure, a garment, an accessory, or other objects on which the presently disclosed optical article is disposed) and combining it with a detector that looks for its constituent part(s). The sequence of steps to perform this methodology is depicted in FIG. 15 and described here:

The input to the system is an image of a scene where an object of interest (such as infrastructure, a garment, an accessory, or other objects on which the presently disclosed optical article is disposed) may be present along with detector models that are trained to find the whole optical article disposed on the object of interest and separately, its constituent parts. The optical article on the object may be completely visible or partially visible due to pose or occlusion. Image patches which can include the optical article are generated in two ways: by intensity thresholding that help segment the constituent parts (as shown in step (b) FIG. 15)

or thresholding combined with morphological operations (as shown in step (c) in FIG. 15).

The part(s) detector is run on the first pool of candidates as they are trained to look for the smaller compositional parts of the optical article (as shown in step (d) in FIG. 15) while the whole object detector is run on the image patches extracted after morphological operations (as shown in step (e) in FIG. 15). Finally, the output of running the two different detector frameworks is combined (as shown in step (f) in FIG. 15). Even if the entire optical article may not be detected by the monolithic detector, the part based detector will discover some of the optical article thereby indicating presence of the article in the scene.

Figure 16:
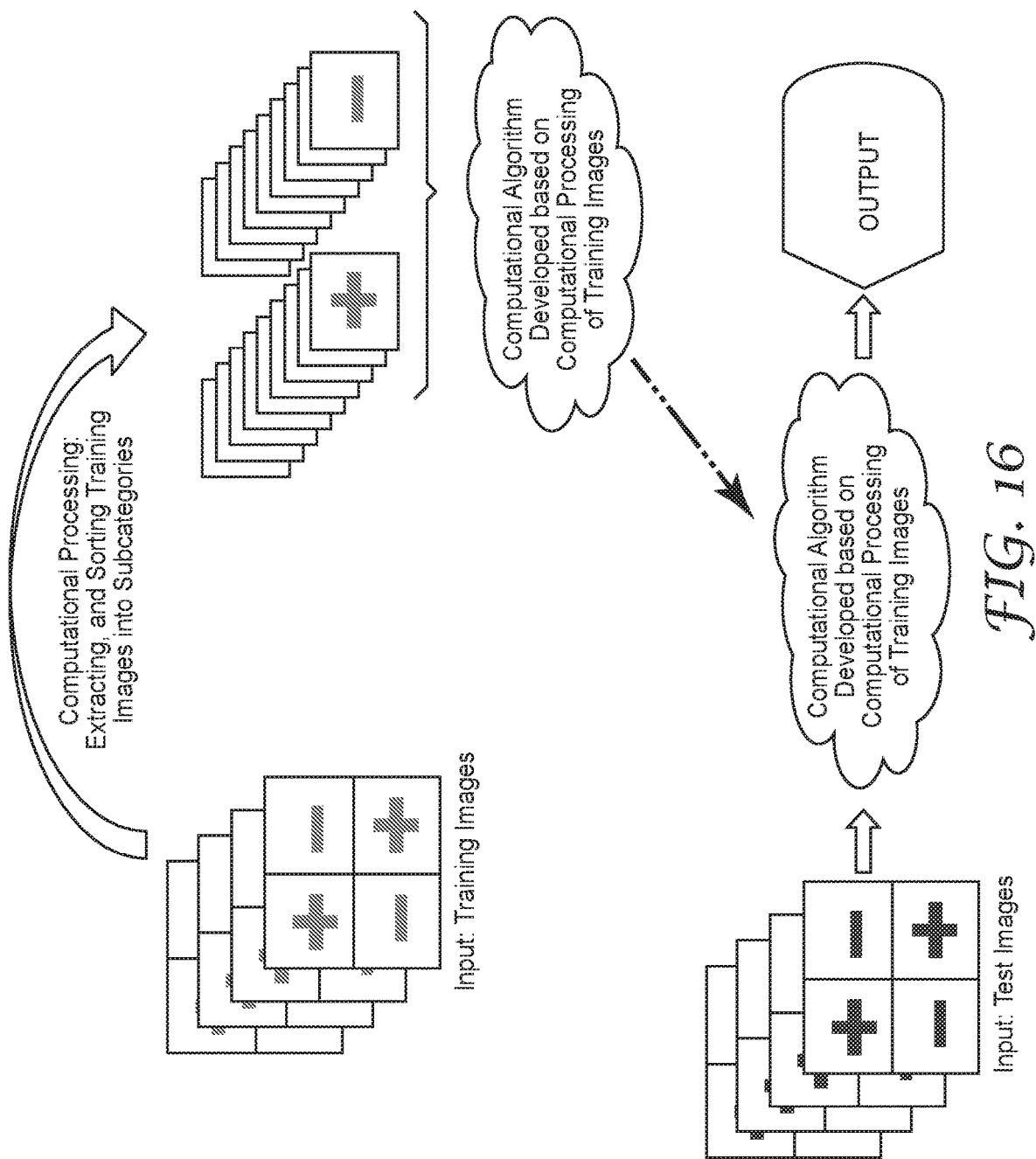
FIG. 16 a process scheme for training and testing a system for observing disclosed articles.

FIG. 16 also offers a process scheme for training and testing a system for observing disclosed articles. The top half of FIG. 16 describes the training of the system. In some embodiments, + (positive data) and − (negative data) are fed into the training. The training could go over some iterations based on the training problem formulation. The lower half of FIG. 16 describes the testing stage when the test set is fed into the trained algorithm and an evaluation is carried out. If the testing stage determines that the figure of merit for identification has not been met, additional training (e.g., via the method depicted in the top half of FIG. 16) can be undertaken.

The input (Training Images or Test Images) can be a plurality of images, wherein each image includes a specific garment configuration in a real-world or synthetic setting. Obtaining the positive dataset can include collecting real world and/or synthetic images/videos of the design on the object of interest (e.g. safety vest under different poses, viewpoint, distance, illumination and occlusion conditions). Obtaining the negative dataset can include collecting images/videos of other objects found in the application environment. Input data (+/−) contains images of an individual wearing a certain design (e.g. standard H design) present in some environment (e.g. near a road). The parts of the image containing the garment represents (+ve) data and all other regions represent (−ve) data. A human or a pre-trained computer (e.g. heuristic guided) labeler marks the regions (with the assistance of a human expert) that contain the garment (+ve data) in these images. Based on these markings, the computer extracts the positive and the negative data from the images.

All this data (Training set) is then utilized to train an algorithm whose goal is to learn to distinguish between the positive and negative data points (image regions). The trained algorithm is then evaluated against an independent test set.

The lower left block in FIG. 16 illustrates an independently collected test dataset (e.g., test images) of positive and negative images/videos of the application environment. The test set may be collected in the same manner as the training set. The computational algorithm can be a classifier algorithm trained for an object of interest using the training dataset. For each garment configuration, a computational algorithm can be developed based on the set of training images for the garment configuration. This can be followed by a set of test images for said garment configuration running through the computational algorithm developed from the input of training images of said garment configuration. The actual labels marked by human on the garments are kept hidden (BLIND STUDY) from the algorithm and may be used as a benchmark for evaluating its performance. Area under curve (AUC) or other measures can be utilized for a quantitative evaluation.

The output from such a system can be obtained by applying the classifier on test dataset(s) and computing metrics for evaluation e.g. classification accuracy, false positive rate, precision, recall, AUC. The final output includes evaluation metrics for evaluating the efficacy of said garment configuration. The output may include classification accuracy, false positive rate, specificity and sensitivity.

While one particular implementation of a computing system is described herein, other configurations and embodiments of computing systems consistent with and within the scope of the present disclosure will be apparent to one of skill in the art upon reading the present disclosure. Various modifications and alterations of the present disclosure will become apparent to those skilled in the art without departing from the scope and spirit of this invention.

EXAMPLES

Objects and advantages may be further illustrated by the following examples, but the particular materials and amounts thereof recited in these examples, as well as other conditions and details, should not be construed to unduly limit this disclosure.

Materials

3M™ SCOTCHLITE™ Reflective Material 8906 Silver Fabric Trim (3M Company, St Paul, Minn.)—referred to in the examples as "silver fabric trim".

3M™ SCOTCHLITE™ Reflective Material C750 Silver Transfer Film (3M Company, St Paul, Minn.)—referred to in the examples as "silver transfer film".

3M™ SCOTCHLITE™ Reflective Material C790 Carbon Black Stretch Transfer Film (3M Company, St Paul, Minn.)—referred to in the examples as "black transfer film".

3M™ SCOTCHLITE™ Reflective Material 8710 Silver Transfer Film (3M Company, St Paul, Minn.)—referred to herein as "silver transfer film 2".

3M™ SCOTCHLITE™ Reflective Material 8986 Fluorescent Red-Orange Flame Resistant Fabric (3M Company, St Paul, Minn.)—referred to herein as "orange fabric".

3M™ SCOTCHLITE™ Reflective Material 8987 Fluorescent Lime-Yellow Flame Resistant Fabric (3M Company, St Paul, Minn.)—referred to herein as "yellow fabric".

A commercially available vest named "High-visibility Class 2 vest", style #100501 made by Carhartt (Dearborn, Mich.) is an example of a 'H' pattern—referred to in the examples as "H pattern vest" or "H pattern garment".

Transmission Measurements

Optical transmission spectra in both the visible and near-infrared wavelength ranges were measured using an optical spectrophotometer (UltrascanPro from Hunter Associates Laboratory Reston, Va.)

Coefficient of Retroreflectivity

Retroreflectivity was measured using the test criteria described in AS™ E810-03 (2013) —Standard Test Method for Coefficient of Retroreflective Sheeting ($R_A$) using the Coplanar Geometry at $0.2_0$ observation angle and $5_0$ entrance angle, i.e. $0.2/5_0$ angle. Retroreflective units are reported in $cd/lux/m_2$.

The angle retroreflectivity measurement followed ANSI/ISEA 107-2010 standard.

Example 1

Non-Quantitative Human Observation

Figure 17C:
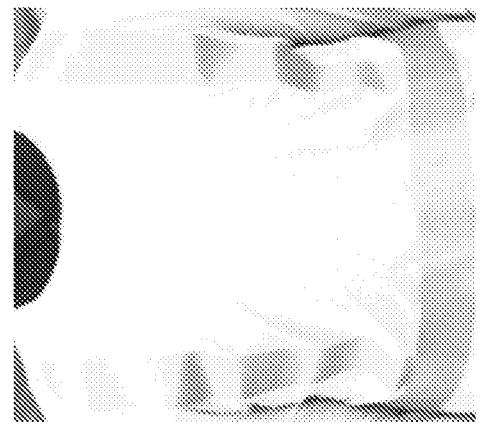
FIGS. 17a, 17b and 17c show images of three articles demonstrated in Example 1.
Figure 17B:
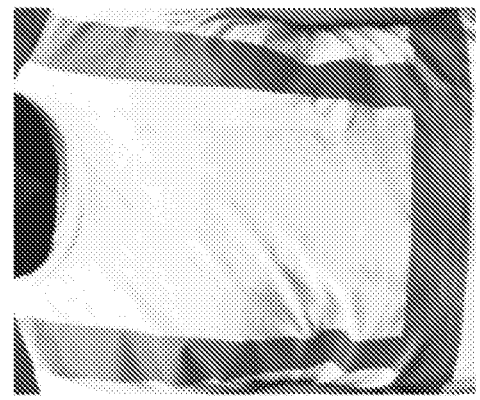
Figure 17A:
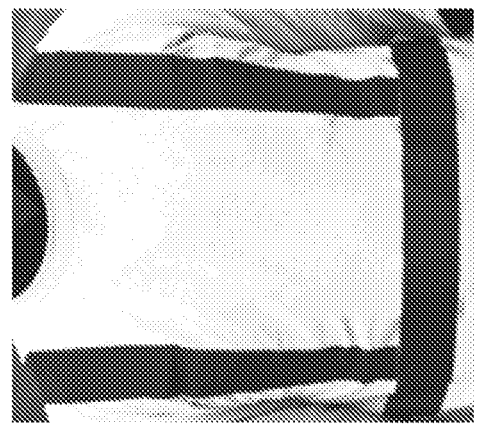

Daytime visual inspection by human observers was utilized to determine that the combination of retroreflective elements in FIG. 17a was more conspicuous than either of the combinations seen in FIG. 17b or 17c.

Example 2

Detectability of Garment Using a Machine Vision System

The following camera systems were utilized. The visible light color camera system was a FLIR Machine Vision (formerly Point Grey) CHAMELEON®3 5MP Color Camera (CM3-U3-50S5C-CS) (FLIR Integrated Imaging Solutions Inc., Richmond BC, CANADA) with an Edmund Optics 25 mm C Series Fixed Focal Length Lens (Edmund Optics Inc. Barrington, N.J.). The near infrared monochrome camera system was a FLIR Machine Vision (formerly Point Grey) CHAMELEON®3 5MP Color Camera (CM3-U3-50S5C-CS) (FLIR Integrated Imaging Solutions Inc., Richmond BC, CANADA) with an Edmund Optics 25 mm C Series Fixed Focal Length Lens (Edmund Optics Inc. Barrington, N.J.) and a BN940 Narrow Near-IR Bandpass Filter (BN940-25.5) (Midwest Optical Systems, Inc. Palatine, Ill.). A 130 mm Over Drive Ring Light 940 nm IR—"EZ Mount Ring Light" from Smart Vision Lights (Muskegon, Mich.) was synched to the NIR camera and served as the light source for the NIR Monochrome Camera system. The light source for the visible light color camera system was either ambient illumination or automobile headlights.

Figure 18D:
FIGS. 18a, 18b, 18c and 18d show images of four different articles demonstrated in Example 2.
Figure 18C:
Figure 18B:
Figure 18A:
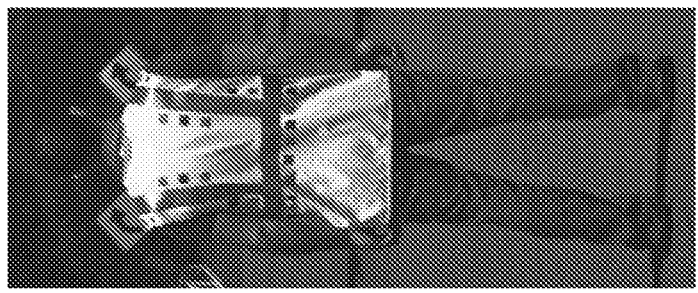

Four illustrative garments were made. Comparative Example 2a was a lime-yellow background vest with a H pattern made thereon with silver fabric trim as seen in FIG. 18a. Comparative Example 2b was the vest of Comparative Example 2a with 25.4 mm squares of silver transfer film affixed adjacent to H pattern with 12.7 mm gap from the H pattern material silver fabric trim as seen in FIG. 18b. Example 2c was the vest of Comparative Example 2a with 25.4 mm squares of black transfer film 1 affixed adjacent to H pattern with 12.7 mm gap from the H pattern silver fabric trim as seen in FIG. 18c. Example 2d was the vest of Comparative Example 2a with 25.4 mm squares of both silver transfer film and black transfer film alternating affixed adjacent to H pattern with 12.7 mm gap from the H pattern material silver fabric trim as seen in FIG. 18d. In the examples shown in FIGS. 18a-18d, the square sizes were 25.4 mm and the gaps from H pattern to squares were 17.2 mm with a square to square gap of 31.75 mm and silver and black squares alternating. The dimension used in these example are based on hardware considerations and ability to detect and analyze features at a preferred observation distance. Other dimensions and configurations are possible.

Images of an individual wearing the high-visibility garments of Comparative Examples 2a and 2b and Examples 2c and 2d were taken under daytime ambient illumination conditions at various distances (e.g., 50, 100, 150 feet) with a visible light color camera system (RGB) and a near-infrared monochrome camera system (NIR). The sample images captured using a visible light color camera system (RGB) at 100 feet are shown in FIGS. 18a, 18b, 18c and 18d.

The images of the garments were segmented into various components (fluorescent background material, silver H pattern component, silver squares, and/or black squares). The maximum, minimum, and median pixel value from the various components was calculated. Table 1 shows this data normalized separately for the NIR and RGB images on a 0-1 scale (with 1 being fully saturated).

TABLE 1

Pixel intensity from daylight images from Inventive and Comparative Examples

| Material | NIR High | NIR Low | NIR Median | RGB High | RGB Low | RGB Median |
|---|---|---|---|---|---|---|
| Fluorescent Lime-Yellow Background | 0.80 | 0.39 | 0.41 | 0.99 | 0.23 | 0.56 |
| Silver Reflective H | 1.00 | 0.36 | 0.62 | 1.00 | 0.11 | 0.20 |
| Silver reflective square | 0.91 | 0.49 | 0.75 | 0.82 | 0.20 | 0.21 |
| Black reflective square | 0.60 | 0.31 | 0.47 | 0.19 | 0.06 | 0.08 |

The pixel intensities from the various examples under outdoor daylight conditions show a wide range in intensity due to material type, orientation, shadowing, etc. The RGB pixel intensity range for the black squares did not overlap with the pixel intensity range for that of the fluorescent background whereas the pixel intensity range for the silver squares and silver H components did overlap with the pixel intensity range for that of the fluorescent background. Therefore, under certain daylighting conditions, regions of the garment containing silver reflective have intensities that are not distinguishable from the background intensity, thereby limiting the ability to utilize the reflective elements for object detection. The garment having the black squares showed less overlap in terms of a range of pixel intensity compared to range of pixel intensity for the background material when imaged using an RGB camera system versus a garment having silver squares. Under similar illumination conditions, the black reflective exhibits superior contrast and provides a more robust contrast with respect to the background material.

Example 3

Example 3a (E3a) was prepared by applying 0.025 m squares black transfer film 1 and laminating them to a H pattern vest with the H-pattern trim silver fabric trim sewn thereon. The squares were positioned 0.013 m from the silver fabric trim on both sides in an alternating pattern and spaced with 0.032 m between the squares. Lamination of the silver transfer film was done using a transfer press such as that commercially available under the trade designation "Stahls' Hotronix Thermal Transfer Press STX20" from Stahls' Hotronix, Carmichaels, Pa. at 130 C (265 F) for a dwell time of 20 seconds at an airline pressure setting of 3-4.

Example 3b (E3b) was prepared by applying 0.025 m squares silver transfer film and black transfer film 1 and laminating them to a H pattern vest with the H-pattern trim silver fabric trim sewn thereon. The squares were positioned 0.013 m from the silver fabric trim on both sides in an alternating pattern and spaced with 0.032 m between the squares. Lamination of the silver transfer film and the black transfer film 1 was done using a transfer press such as that commercially available under the trade designation "Stahls' Hotronix Thermal Transfer Press STX20" from Stahls' Hotronix, Carmichaels, Pa. at 177 C (350 F) for a dwell time of 15 seconds at an airline pressure setting of 3-4.

Comparative Example 1 (CE3c) is a commercially available vest named "High-visibility Class 2 vest", style #100501 made by Carhartt, Dearborn, Mich., using 3M Scotchlite 8906 Silver Fabric Trim sewn onto lime yellow cotton polyester mesh vest.

Comparative Example 2 (CE3d) was prepared by applying 0.025 m squares of silver transfer film and laminating them to a H pattern vest with the H-pattern trim silver fabric trim sewn thereon. The squares were positioned 0.013 m from the silver fabric trim on both sides in an alternating pattern and spaced with 0.032 m between the squares. Lamination of the silver transfer film was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 3-4.

Comparative Example 3 (CE3e) was prepared by applying 0.025 m squares of silver transfer film and laminating them to a H pattern vest with the H-pattern trim silver fabric trim sewn thereon. The squares of Scotch 2510 Black Masking Tape/Ruban/Cinta and the squares of silver transfer film were positioned on the H pattern vest (laminated for the silver transfer film and adhered for the black masking tape) in an alternating pattern (i.e. silver-colored retroreflective material followed by black tape squares) and spaced 0.032 m in between squares.

Figure 38:
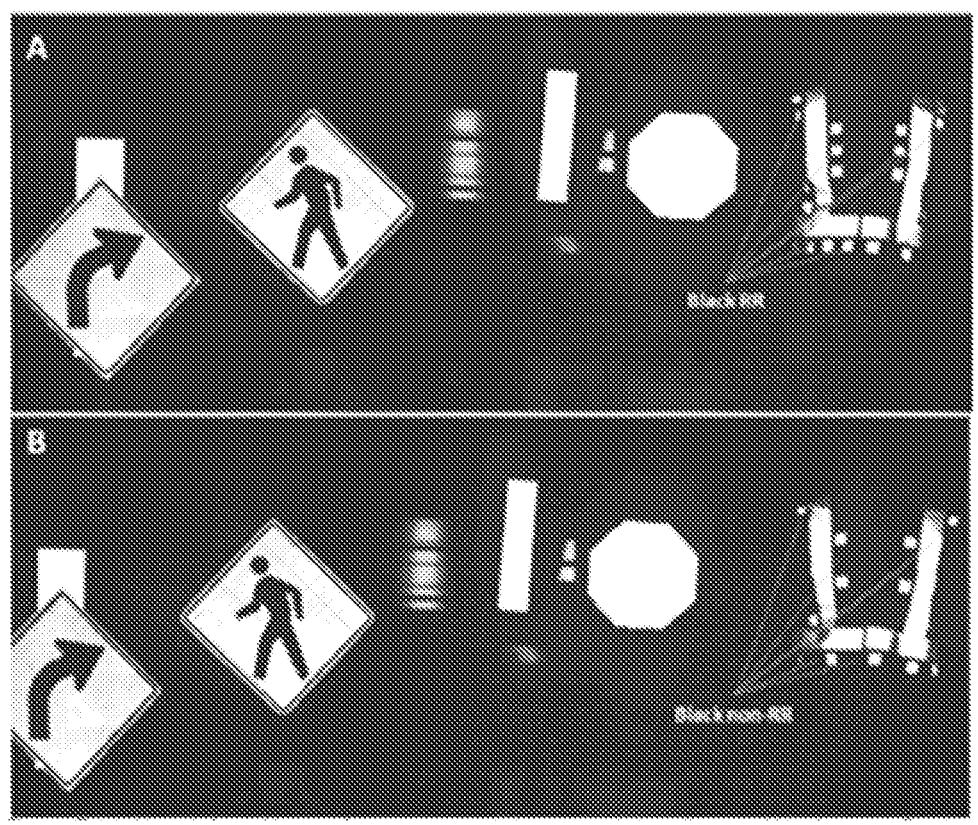
FIG. 38 is an image of the vests of Example 3a and CE3e taken in the dark with a near infrared system.

FIG. 38 shows an image of the vest of Example 3b (top panel) and CE3e (bottom panel) captured with the NIR system described above. As seen by comparing the two panels, the retroreflective properties provided by the black retroreflective film versus the black tape provide additional signal and additional occlusion resistance if some of the squares are blocked by the wearer or other obstructions.

Example 4

BRDF Measurements of Optical Contrasts Using Bright Coverage Determination

Two replicate photopic BRDFs (bi-directional reflectance distribution functions) were measured for each sample with and $\theta=0°$, $16°$, $30°$, $45°$, $60°$ and $75°$ and $\phi=90°$ with a Radiant Imaging IS-SA Imaging Sphere (Radiant Vision Systems formerly Radiant Imaging, Redmond, Wash., USA). The photopic BRDF corresponds to the CIE-Y BRDF measured with this instrument. This instrument gives CIE-Y values for illuminant E.

The analyses were conducted under a variety of different illumination conditions that represent real-life scenarios for daytime illumination. The analysis was focused on the CIE-Y BRDFs, as the Y factor represents relative luminance or a level of relative brightness. The CIE-Y BRDFs were exported using the IS-SA instrument software into Cartesian coordinates in $\theta_X$-$\theta_Y$ space with increment and resolution for the exported data set to 1°. Note that the instrumental resolution is about 1.5°. The $\theta_X$-$\theta_Y$ angle space is defined as $$\theta_X=\theta*\sin(\phi) \quad \theta_Y=\theta*\cos(\phi)$$

The BRDFs were converted into $u_X$-$u_Y$ space and then thresholded in the region in $u_X$-$u_Y$ space where $u<\sin(70°)$ and $u_Y<\sin(\theta-15°)$ with threshold values of 0.05, 0.10 and 0.15 inverse steradians. The threshold values were chosen based on applications with typical background fabrics used in high-visibility safety garment applications as referenced in standards such as ANSI/ISEA-107 (2015) and EN ISO 20471. For example, a typical fluorescent lime-yellow fabric used in high-visibility garments can be approximated as a Lambertian reflector with a CIE-Y BRDF of about 0.18 inverse steradians. A typical fluorescent orange fabric used in high-visibility garments can be approximated as a Lambertian reflector with a CIE-Y BRDF of about 0.10 inverse steradians. Therefore, 0.05, 0.10 and 0.15 inverse steradians are reasonable CIE-Y BRDF cutoff values.

The thresholded BRDF images were used to calculate the bright coverage for the respective retroreflective materials. Tables 2 to 4 give the bright coverage values averaged over the two replicated measurements. The weighted average bright coverage percent was obtained by weighting the bright coverage using a weighting factor proportional to cosine of theta. The weighting factors were normalized so that their sum is equal to unity. The weighted-averaged bright coverage gives a metric that samples a broad range of illumination and viewing geometries that can occur as mentioned earlier.

TABLE 2

Bright coverage (%) for BRDF cutoff = 0.05 inverse steradian

| Sample ID | Incidence Angles (degrees) | | | | | | Weighted Average |
|---|---|---|---|---|---|---|---|
| | 0 | 16 | 30 | 45 | 60 | 75 | |
| Black transfer film | 3.5 | 9.1 | 4.9 | 9.3 | 8.1 | 11.2 | 7.0 |
| Orange fabric | 100.0 | 100.0 | 100.0 | 100.0 | 100.0 | 100.0 | 100.0 |
| Silver fabric film | 50.1 | 84.0 | 77.2 | 51.1 | 41.0 | 33.2 | 61.2 |

TABLE 3

Bright coverage (%) for BRDF cutoff = 0.10 inverse steradian

| Sample ID | Incidence Angles (degrees) | | | | | | Weighted Average |
|---|---|---|---|---|---|---|---|
| | 0 | 16 | 30 | 45 | 60 | 75 | |
| Black transfer film | 0.0 | 0.0 | 0.0 | 2.2 | 3.4 | 4.2 | 1.0 |
| Orange fabric | 100.0 | 100.0 | 100.0 | 100.0 | 100.0 | 100.0 | 100.0 |
| Silver fabric film | 16.8 | 49.2 | 46.4 | 28.5 | 17.7 | 12.9 | 31.8 |

TABLE 4

Bright coverage (%) for BRDF cutoff = 0.15 inverse steradian

| Sample ID | Incidence Angles (degrees) | | | | | | Weighted Average |
|---|---|---|---|---|---|---|---|
| | 0 | 16 | 30 | 45 | 60 | 75 | |
| Black transfer film | 0.0 | 0.0 | 0.0 | 0.0 | 1.9 | 2.3 | 0.4 |
| Orange fabric | 2.5 | 7.7 | 19.9 | 25.8 | 44.7 | 32.0 | 17.7 |
| Silver fabric film | 6.5 | 35.5 | 29.5 | 19.9 | 11.9 | 8.0 | 20.5 |

The results show that the black reflector gives the lowest bright coverage which is desirable when using with typical background materials used with high-visibility garments. The other reflectors give much higher bright coverage values. The lower bright coverage from the black transfer film provides a significantly higher contrast, and therefore better detection under a wider variety of illumination conditions, compared to a typical silver material by itself.

Example 5

Observation of Angular Sensitivity

Figure 19:
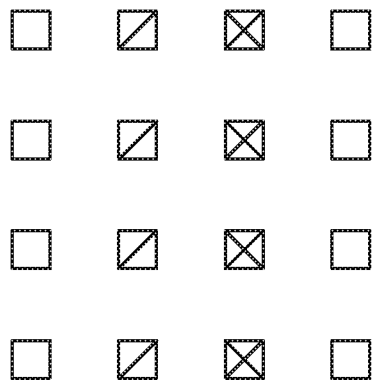

Example 5a (E5a) was prepared by cutting 0.025 m squares of 3M Scotchlite 8725 Silver Transfer Film, 3M Scotchlite 8965 White Fabric and SRI part #: RC-C725-30.0CM-8001-CP4 and laminating or adhering them to cotton woven fabric. Squares were positioned in a grid with 0.05 m spaces between squares in the X and Y directions and positioned in a parallel pattern to create vertical columns across the grid. Lamination of the 3M Scotchlite 8725 Silver Transfer Film and SRI part #: RC-C725-30.0CM-8001-CP4 was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. Adhesion of the 3M Scotchlite 8965 White Fabric was done using Scotch™ Essentials Wardrobe Tape available from 3M Company of St Paul, Minn. See FIG. 19.

Figure 20:
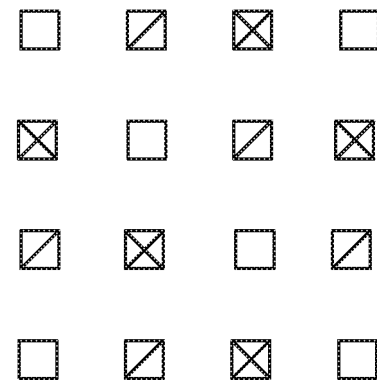

Example 5b (E5b) was prepared by cutting 0.025 m squares of 3M Scotchlite 8725 Silver Transfer Film, 3M Scotchlite 8965 White Fabric and SRI part #: RC-C725-30.0CM-8001-CP4 and laminating or adhering them to cotton woven fabric. Squares were positioned in a grid with 0.05 m spaces between squares in the X and Y directions in an ABC alternating pattern to create diagonal rows across the grid. Lamination of the 3M Scotchlite 8725 Silver Transfer Film and SRI part #: RC-C725-30.0CM-8001-CP4 was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. Adhesion of the 3M Scotchlite 8965 White Fabric was done using Scotch™ Essentials Wardrobe Tape available from 3M Company of St Paul, Minn. See FIG. 20.

Figure 21:
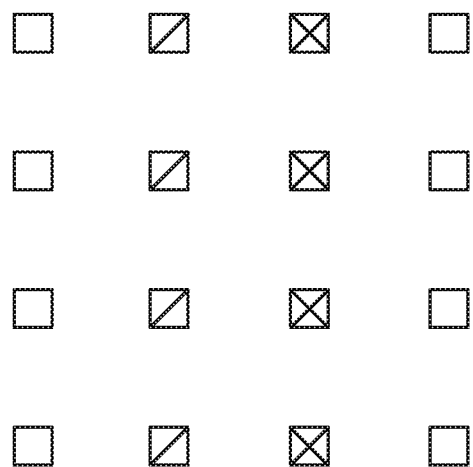
Figure 22:
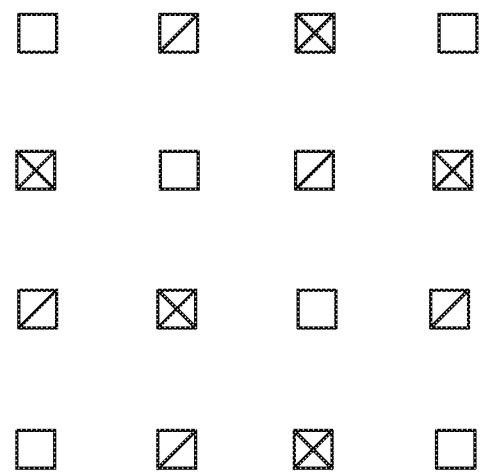

Example 5c (E5c) was prepared in columns as in Example 1, but the squares were spaced 0.075 m apart. See FIG. 21.

Example 5e (E5e) was prepared in columns as in Example 1, but the squares were spaced 0.1 m apart. See FIG. 23.

Example 5f (E5f) was prepared in diagonal rows as in Example 2, but the squares were spaced 0.1 m apart. See FIG. 24.

Example 5g (E5g) was prepared by cutting 0.013 m squares of 3M Scotchlite 8725 Silver Transfer Film, 3M Scotchlite 8965 White Fabric and SRI part #: RC-C725-30.0CM-8001-CP4 and laminating or adhering them to cotton woven fabric. Squares were positioned in a grid with 0.025 m spaces between squares in the X and Y directions and positioned in a parallel pattern to create vertical columns across the grid. Lamination of the 3M Scotchlite 8725 Silver Transfer Film and SRI part #: RC-C725-30.0CM-8001-CP4 was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. Adhesion of the 3M Scotchlite 8965 White Fabric was done using Scotch™ Essentials Wardrobe Tape available from 3M Company of St Paul, Minn. See FIG. 25.

Example 5h (E5h) was prepared by cutting 0.013 m squares of 3M Scotchlite 8725 Silver Transfer Film, 3M Scotchlite 8965 White Fabric and SRI part #: RC-C725-30.0CM-8001-CP4 and laminating or adhering them to cotton woven fabric. Squares were positioned in a grid with 0.025 m spaces between squares in the X and Y directions in an ABC alternating pattern to create diagonal rows across the grid. Lamination of the 3M Scotchlite 8725 Silver Transfer Film and SRI part #: RC-C725-30.0CM-8001-CP4 was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. Adhesion of the 3M Scotchlite 8965 White Fabric was done using Scotch™ Essentials Wardrobe Tape available from 3M Company of St Paul, Minn. See FIG. 26.

Example 5i (E5i) was prepared in columns as in Example 7, but the squares were spaced 0.038 m apart. See FIG. 27.

Example 5j (E5j) was prepared in diagonal rows as in Example 8, but the squares were spaced 0.038 m apart. See FIG. 28.

Example 5k (E5k) was prepared in columns as in Example 7, but the squares were spaced 0.05 m apart. See FIG. 29.

Example 5l (E5l) was prepared in diagonal rows as in Example 8, but the squares were spaced 0.05 m apart. See FIG. 30.

Comparative Example 5 m (C5 m) was prepared by cutting 0.025 m squares of 3M Scotchlite 8725 Silver Transfer Film and laminating them to woven cotton fabric. Squares were positioned in a grid with 0.05 m spaces between squares in the X and Y directions. Lamination was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. See FIG. 31.

Comparative Example 5n (C5n) was prepared by cutting 0.025 m squares of 3M Scotchlite 8965 White Fabric and adhering them to woven cotton fabric. Squares were positioned in a grid with 0.05 m spaces between squares in the X and Y directions. Adhesion was done using Scotch™ Essentials Wardrobe Tape available from 3M Company of St Paul, Minn. See FIG. 32.

Comparative Example 5o (C5o) was prepared by cutting a 0.1 m square of 3M Scotchlite 8725 Silver Transfer Film and laminating to woven cotton fabric. Lamination was done using a transfer press such as that commercially available under the trade designation "Stahls' Hotronix Thermal Transfer Press STX20" from Stahls' Hotronix, Carmichaels, Pa. at 177 C (350 F) for a dwell time of 20 seconds at an airline pressure setting of 4. See FIG. 33.

This test was performed using the low beam headlights of a 2015 Toyota Highlander XLE driving at a speed of approx. 15 mph. with a Nikon D7000 16.2 megapixel Digital SLR camera with a Nikon 105 mm Lens (Nikon, Tokyo, JAPAN), attached to a tripod and placed above the middle console and in line with the driver's head. Two (2) observers were sitting in the back of the car and one driver was gathering appearance data along with the photo and video recorded with the camera. Examples 5a-5l were mounted on foam 1.2×2.4 m core or tube 0.22 m diameter and were tested with at least one of Comparative Examples 5m to 5o. The samples were rotated +/−approximately 90 angle around the vertical and then the horizontal axes. The car stopped every 76 m between 610 m and 3 m to evaluate samples by notation and photo documentation.

Table 5 describes samples and appearance at different viewing distances. Legend: S—Silver, B—Black, W—White, C—Column, D—Diagonal, So—Solid, M—monochromatic.

TABLE 5

| Example | shape size (m) | spacing | material | pattern | distance first visible (m) | distance flickering observed (m) | distance shapes observed (m) |
|---|---|---|---|---|---|---|---|
| E5a | 0.025 × 0.025 | 2x | S/B/W | C | 533 | 381 | 244 |
| E5b | 0.025 × 0.025 | 2x | S/B/W | D | >152 | >152 | >152 |
| E5c | 0.025 × 0.025 | 3x | S/B/W | C | >152 | >152 | >152 |
| E5e | 0.025 × 0.025 | 4x | S/B/W | C | 381 | 305 | 244 |
| E5f | 0.025 × 0.025 | 4x | S/B/W | D | >152 | >152 | >152 |
| E5g | 0.013 × 0.013 | 2x | S/B/W | C | >152 | >152 | >76 |
| E5h | 0.013 × 0.013 | 2x | S/B/W | D | >152 | >176 | >76 |
| E5i | 0.013 × 0.013 | 3x | S/B/W | C | >152 | >152 | >152 |
| E5j | 0.013 × 0.013 | 3x | S/B/W | D | >152 | >152 | >152 |
| E5k | 0.013 × 0.013 | 4x | S/B/W | C | >152 | >152 | >152 |
| E5l | 0.013 × 0.013 | 4x | S/B/W | D | >152 | >152 | >152 |
| C5m | 0.025 × 0.025 | 2x | S | M | 533 | N/A | 183 |
| C5n | 0.025 × 0.025 | 2x | W | M | 381 | N/A | 244 |
| C5o | 0.1 × 0.1 | 0x | S | So | >152 | N/A | N/A |

Table 6 indicates head on brightness showing all reflecting and 2 off angles demonstrating how the retro reflectivity changes with the viewing angle of different materials. Because of the different off-angle retro-reflective properties of the materials, as shown in Table 6, different angles create different appearances. At head on angles, where all materials reflect well, the full array is seen while at angles further to the side from head on (off angles) materials with low off-angle retro reflectivity do not reflect much therefore these rows or columns tend to disappear. Table 6 shows the very low off-angle reflectivity of the SRI part #: RC-C725-30.0CM-8001-CP4.

TABLE 6

| Angle | Black candelas/ (lux * meter$^2$) | Silver candelas/ (lux * meter$^2$) | White candelas/ (lux * meter$^2$) |
|---|---|---|---|
| 0.2, 5 (Head-on) | 393 | 514 | 104 |
| 0.2, 40 | 9 | 324 | 39 |
| 0.33, 30 | 43 | 348 | 57 |

Figure 34:
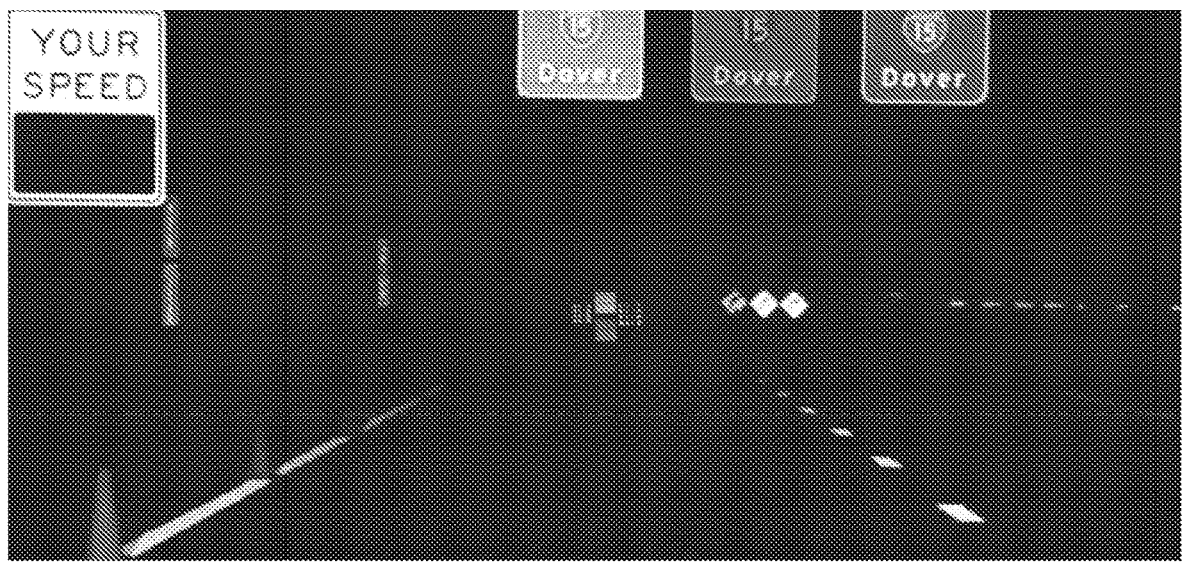
FIG. 34 is an image of panels oriented close to 'head-on' entrance angle orientation for modified 'yaw angle' experiment. Distance from panel to source/camera was approximately 152 m.
Figure 35:
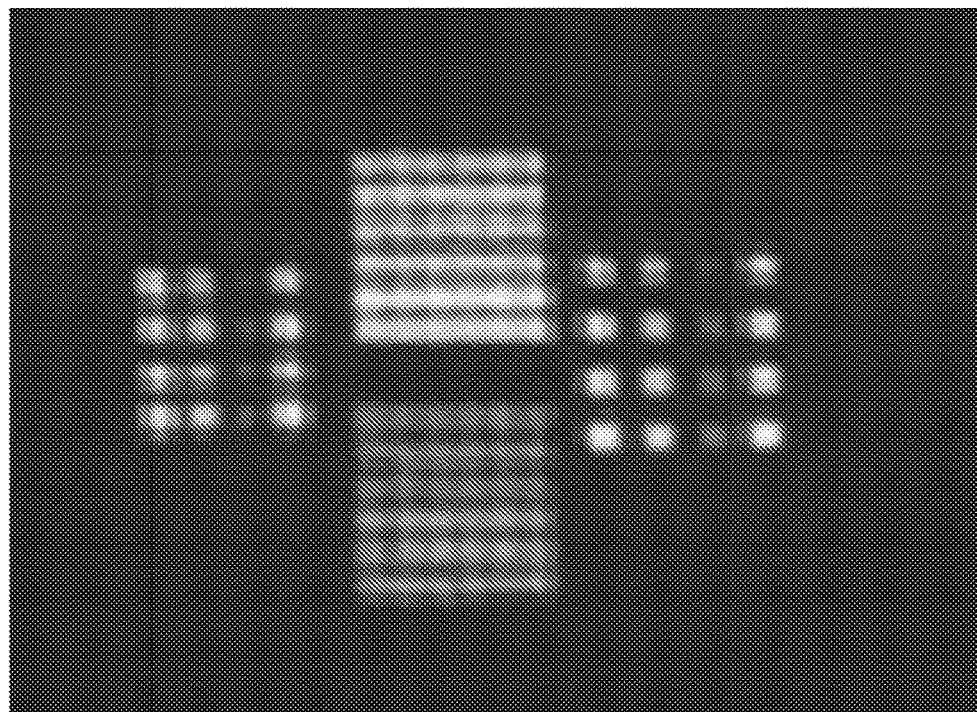
FIG. 35 is a magnified image of the test panel from FIG. 34 identifying the 0.025×0.025 m retroreflective elements.
Figure 36:
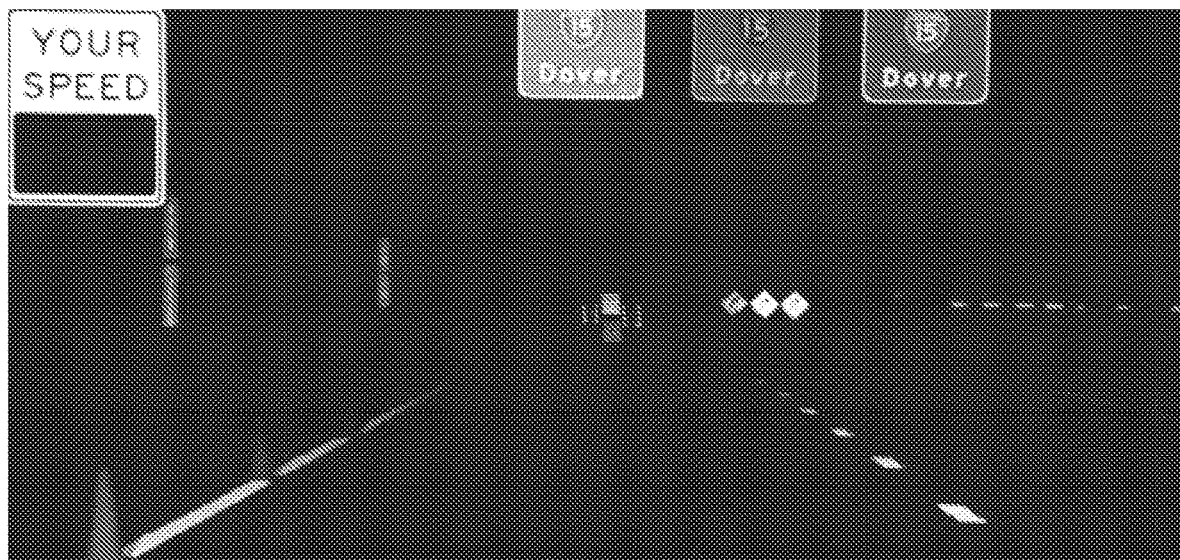
FIG. 36 is an image of the test panel oriented at a 'yaw angle' orientation of approximately 30 degrees with respect to the viewing direction.
Figure 37:
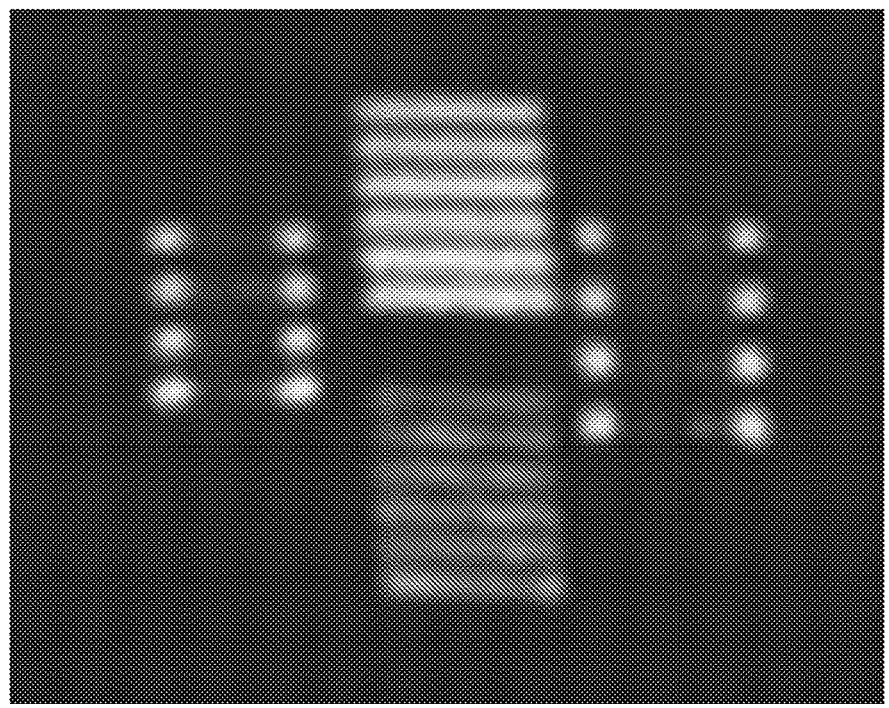
FIG. 37 is a magnified image of the test panel from FIG. 36 identifying the 0.025×0.025 m retroreflective elements.

FIGS. 34 and 35 shows head on and FIGS. 36 and 37 shows these rows virtually disappearing at off angles. FIG. 34 shows an image of panels oriented close to 'head-on' entrance angle orientation for modified 'yaw angle' experiment. Distance from panel to source/camera was approximately 152 m. FIG. 35 shows a magnified image of the test panel from FIG. 34 identifying the 0.025×0.025 m retroreflective elements. Under this orientation (surface normal of the panel approximately parallel with the illumination source/detector light), all of the retroreflective elements are visible. FIG. 36 shows an image of the test panel oriented at a 'yaw angle' orientation of approximately 30 degrees with respect to the viewing direction. Under these conditions, the silver retroreflective elements are still visible, but the black retroreflective elements are significantly less visible. FIG. 37 shows a magnified image of the test panel from FIG. 36 identifying the 0.025×0.025 m retroreflective elements. Under these conditions, the silver retroreflective elements are still visible, but the black retroreflective elements are significantly less visible.

The on/off blinking occurred with these grid patterns. With ring patterns such as bullseye, the overglow of the brighter materials causes the brighter materials to appear to grow and shrink (or pulse) as the adjacent materials become more dim. Other dynamically varying effects created by arranging the shapes could include vanishing effect, growing/enlarging effect, other optical illusions of movement, etc.

Embodiments

Disclosed herein are optical articles comprising a spatially defined arrangement of a plurality of data rich retroreflective elements, wherein the plurality of retroreflective elements comprise retroreflective elements having at least two different retroreflective properties and at least two different optical contrasts with respect to a background substrate when observed within an ultraviolet spectrum, a visible spectrum, a near-infrared spectrum, or a combination thereof.

Also disclosed are articles according to previous embodiments, wherein the retroreflective elements have at least two different optical contrasts in the near-infrared region with respect to the background substrate. Also disclosed are articles according to any of the previous embodiments, wherein the difference in optical contrast is described by a bright coverage of 0.05 with weighted average bright coverage of less than 50 percent. Also disclosed are articles according to any of the previous embodiments, wherein the difference in optical contrast has a 0.05 bright coverage with weighted average bright coverage of less than 25 percent. Also disclosed are articles according to any of the previous embodiments, wherein the difference in optical contrast has a 0.05 bright coverage with weighted average bright coverage of less than 15 percent. Also disclosed are articles according to any of the previous embodiments, wherein the difference in optical contrast has a 0.10 bright coverage with weighted average bright coverage of less than 25 percent. Also disclosed are articles according to any of the previous embodiments, wherein the difference in optical contrast has a 0.10 bright coverage with weighted average bright coverage of less than 20 percent. Also disclosed are articles according to any of the previous embodiments, wherein the difference in optical contrast has a 0.10 bright coverage with weighted average bright coverage of less than 15 percent. Also disclosed are articles according to any of the previous embodiments, wherein the difference in optical contrast has a 0.15 bright coverage with weighted average bright coverage of less than 15 percent. Also disclosed are articles according to any of the previous embodiments, wherein the retroreflectivity coefficient of the retroreflective elements at an observation angle/entrance angle 0.2°/5° is greater than 50 cd/lux-m2, greater than 100 cd/lux-m2, or greater than 200 cd/lux-m2. Also disclosed are articles according to any of the previous embodiments, the optical article comprises high visibility safety apparel. Also disclosed are articles according to any of the previous embodiments, wherein the data rich plurality of retroreflective elements are configured in a repeating spatially defined arrangement such that the information is interpretable even when the portion of the retroreflective elements are occluded. Also disclosed are articles according to any of the previous embodiments, wherein the optical article is a deformable optical article. Also disclosed are articles according to any of the previous embodiments, wherein the deformation is at least one of a shrinkage or an expansion. Also disclosed are articles according to any of the previous embodiments, wherein the deformation causes a spacing change between at least two of the retroreflective elements. Also disclosed are articles according to any of the previous embodiments, wherein the deformation is reversible. Also disclosed are articles according to any of the previous embodiments, wherein at least two different retroreflective properties are at least two different retroreflective intensity values. Also disclosed are articles according to any of the previous embodiments, wherein at least two different retroreflective properties are at least two different retroreflective intensity values when viewed at different viewing angles. Also disclosed are articles according to any of the previous embodiments, the retroreflective property changes in response to a change in condition. Also disclosed are articles according to any of the previous embodiments, wherein the change in condition is at least one of a change in thermal, moisture, mechanical deformation, or radiation. Also disclosed are articles according to any of the previous embodiments, wherein the retroreflective elements are individually sized and separated from one another such that each individual retroreflective element is resolvable at desired distances from the optical article. Also disclosed are articles according to any of the previous embodiments, wherein the spatially defined arrangement comprises geometric arrangement in which the retroreflective elements are positioned with a distance from their neighboring retroreflective elements, and wherein the retroreflective elements have a periodicity from one element to another within the spatially defined arrangement. Also disclosed are articles according to any of the previous embodiments, wherein the periodicity is a regular periodicity. Also disclosed are articles according to any of the previous embodiments, the periodicity is an irregular periodicity. Also disclosed are articles according to any of the previous embodiments, wherein the spatially defined arrangement is rotationally insensitive. Also disclosed are articles according to any of the previous embodiments, wherein a number of geometric arrangements required per spatially defined arrangement depends on a required quality of fit. Also disclosed are articles according to any of the previous embodiments, wherein the retroreflective elements are positioned from their nearest neighboring retroreflective elements by a characteristic distance. Also disclosed are articles according to any of the previous embodiments, wherein the retroreflective elements have a characteristic ratio of size to distance to neighboring retroreflective elements that is invariant with viewing angle. Also disclosed are articles according to any of the previous embodiments further comprising a printed layer disposed on the outer surface of at least a portion of the retroreflective elements. Also disclosed are articles according to any of the previous embodiments, wherein the retroreflective properties are detectable in the infrared spectrum. Also disclosed are articles according to any of the previous embodiments, wherein the at least two retroreflective elements are discontinuous. Also disclosed are articles according to any of the previous embodiments, wherein the plurality of retroreflective elements are discontinuous. Also disclosed are articles according to any of the previous embodiments, wherein the optical article is disposed on a substrate selected from at least one of infrastructure, wearables, and vehicles.

Also disclosed are fabrics comprising the article according to any of the previous embodiments.

Also disclosed are systems that comprise a) an article according to any of the previous embodiments; b) an optical system; and c) an inference engine for interpreting and classifying the plurality of retroreflective elements wherein the optical system feeds data to the inference engine.

Also disclosed are systems according to any of the previous embodiments, wherein the article is disposed on at least one of infrastructure, targets, wearables, and vehicles. Also disclosed are systems according to any of the previous embodiments, the optical system is part of a vehicle, and further wherein the vehicle uses the information as an input to an autonomous driving module. Also disclosed are systems according to any of the previous embodiments, wherein the vehicle uses the information to provide human language feedback to the driver. Also disclosed are systems according to any of the previous embodiments, wherein the vehicle uses the information to provide at least one of haptic, audible or visual feedback to the driver. Also disclosed are systems according to any of the previous embodiments, the data rich plurality of retroreflective elements is visible in the infrared spectrum. Also disclosed are systems according to any of the previous embodiments, the information related to the data rich plurality of retroreflective articles comprises at least one of road workers expected, pedestrians expected, construction workers expected, students expected, emergency responder workers expected. Also disclosed are systems according to any of the previous embodiments, wherein the inference engine is locally stored as a component of the optical system. Also disclosed are systems according to any of the previous embodiments, the optical system communicates with the inference engine using a wireless communication protocol.

Thus, embodiments of optical articles and systems interacting with the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An optical article comprising a spatially defined arrangement of a plurality of data rich retroreflective elements, wherein the plurality of retroreflective elements comprise retroreflective elements having at least two different retroreflective properties and at least two different optical contrasts with respect to a background substrate when observed within an ultraviolet spectrum, a visible spectrum, a near-infrared spectrum, or a combination thereof; wherein the spatially defined arrangement comprises geometric arrangement in which the retroreflective elements are positioned with a distance from their neighboring retroreflective elements, and wherein the retroreflective elements have a periodicity from one element to another within the spatially defined arrangement.

2. The article according to claim 1, wherein the retroreflective elements have at least two different optical contrasts in the near-infrared region with respect to the background substrate, and wherein the difference in optical contrast is described by a bright coverage of 0.05 with weighted average bright coverage of less than 50 percent.

3. The article according to claim 2, wherein the difference in optical contrast has a 0.05 bright coverage with weighted average bright coverage of less than 25 percent.

4. The article according to claim 2, wherein the difference in optical contrast has a 0.05 bright coverage with weighted average bright coverage of less than 15 percent.

5. The article according to claim 2, wherein the difference in optical contrast has a 0.10 bright coverage with weighted average bright coverage of less than 25 percent.

6. The article according to claim 2, wherein the difference in optical contrast has a 0.10 bright coverage with weighted average bright coverage of less than 20 percent.

7. The article according to claim 2, wherein the difference in optical contrast has a 0.10 bright coverage with weighted average bright coverage of less than 15 percent.

8. The article according to claim 2, wherein the difference in optical contrast has a 0.15 bright coverage with weighted average bright coverage of less than 15 percent.

9. The article according to claim 6, wherein the retroreflectivity coefficient of the retroreflective elements at an observation angle/entrance angle 0.2°/5° is greater than 50 cd/lux-m2, greater than 100 cd/lux-m2, or greater than 200 cd/lux-m2.

10. The article according to claim 6, wherein the optical article comprises high visibility safety apparel.

11. The article according to claim 6, wherein the optical article is a deformable optical article.

12. The article of claim 11, wherein deformation of the deformable optical article is at least one of a shrinkage or an expansion, and wherein the deformation causes a spacing change between at least two of the retroreflective elements, and further wherein the deformation is reversible.

13. The article according to claim 6, wherein the retroreflective property changes in response to a change in condition.

14. The article according to claim 13 wherein the change in condition is at least one of a change in thermal, moisture, mechanical deformation, or radiation.

15. The article according to claim 1, wherein the periodicity is a regular periodicity.

16. The article according to claim 1, wherein the periodicity is an irregular periodicity.

17. The article according to claim 1, wherein the spatially defined arrangement is rotationally insensitive.

* * * * *